United States Patent
Oneda

[11] Patent Number: 6,142,371
[45] Date of Patent: Nov. 7, 2000

[54] CUSTOMER SERVICE APPARATUS, METHOD AND CARD, AND COMPUTER READABLE RECORD MEDIUM HAVING CUSTOMER SERVICE PROCESSING PROGRAM RECORDED THEREON

[75] Inventor: Hideo Oneda, Kawasaki, Japan

[73] Assignee: Fujitsu Limited, Kawasaki, Japan

[21] Appl. No.: 09/163,435

[22] Filed: Sep. 30, 1998

[30] Foreign Application Priority Data

Apr. 30, 1998 [JP] Japan .................................. 10-120600

[51] Int. Cl.⁷ ...................................................... G06K 5/00
[52] U.S. Cl. ............................ 235/380; 235/381; 705/43
[58] Field of Search .................................. 235/380, 375, 235/379, 383, 381, 382, 492; 705/43, 44, 42

[56] References Cited

U.S. PATENT DOCUMENTS 5,117,335  5/1992  McCarthy ................................ 364/405
5,635,696  6/1997  Dabrowski .............................. 235/449
5,901,303  5/1999  Chew ...................................... 395/400

*Primary Examiner*—Thien M. Le
*Attorney, Agent, or Firm*—Staas & Halsey LLP

[57] ABSTRACT

An IC card has a built-in integrated circuit including a processor and a memory. The memory stores therein purchase history information having purchase results recorded on a genre-to-genre basis and premium information having premium values defined in accordance with the purchase results on a genre-to-genre basis. A service processing unit refers to the purchase history information of the IC card on the basis of the genre of a purchased commodity to acquire purchase results. The service processing unit further refers to the premium information of the IC card on the basis of the acquired purchase results to acquire corresponding premium values, thereby providing discount services or points in conformity with the acquired premium values.

29 Claims, 34 Drawing Sheets

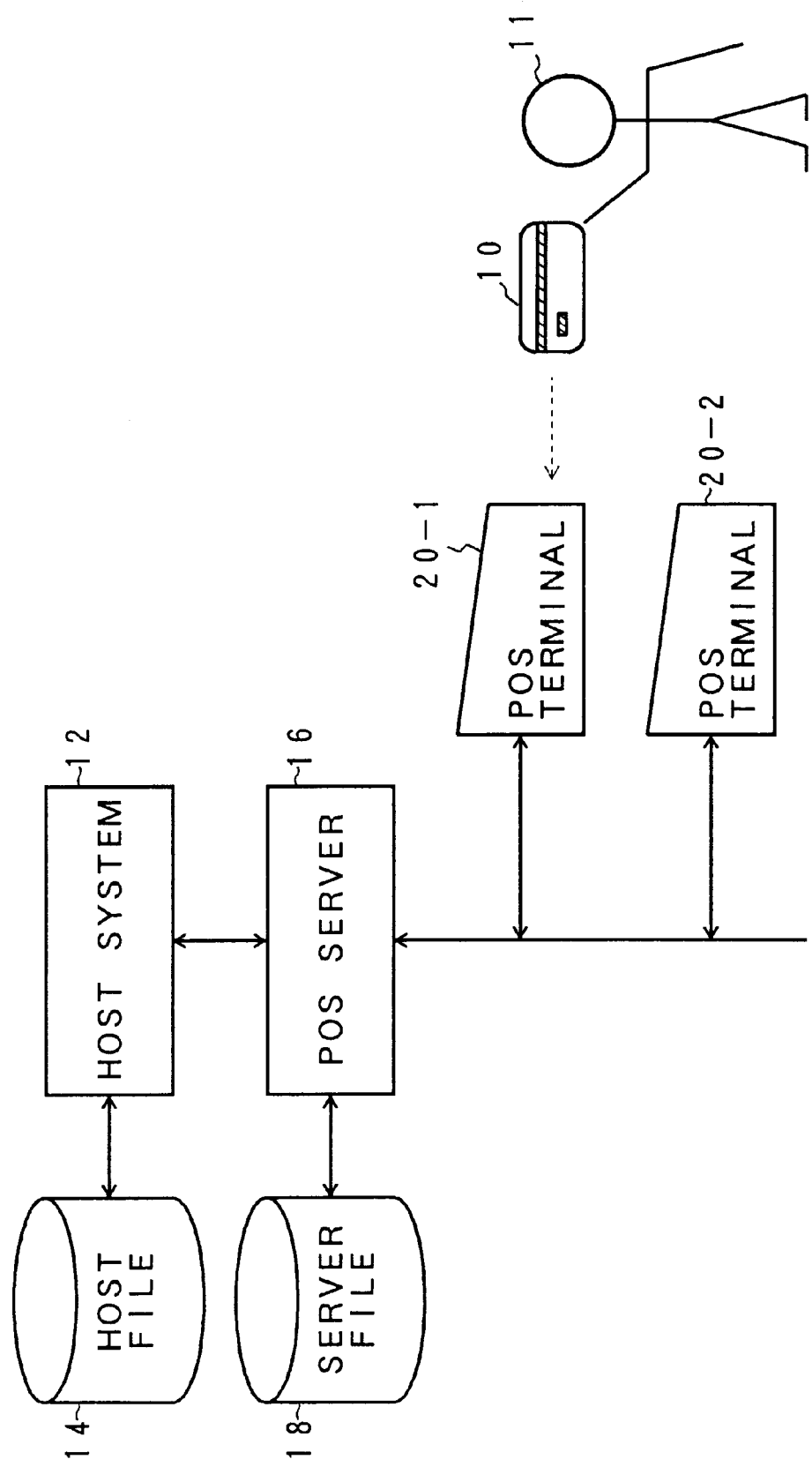

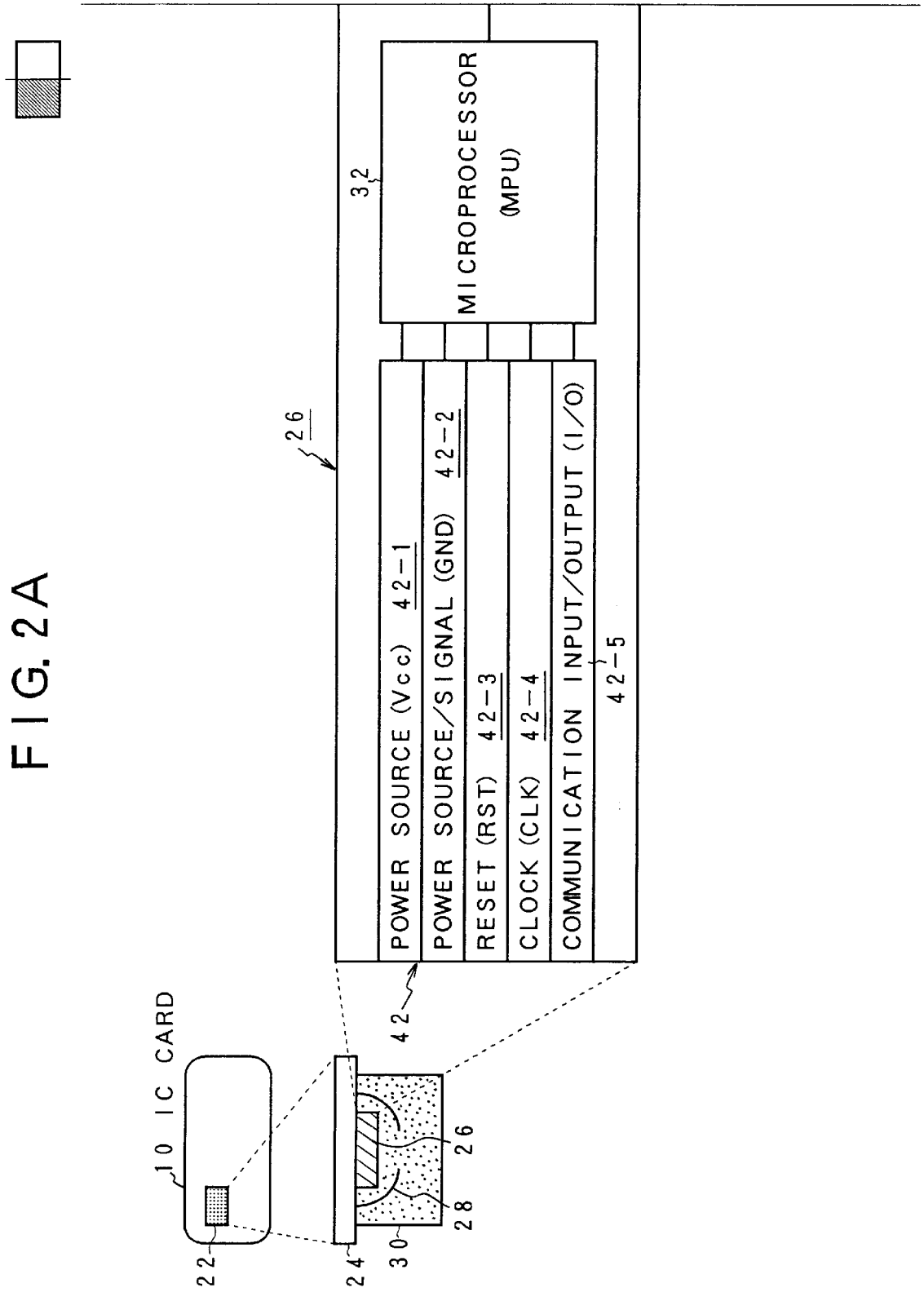

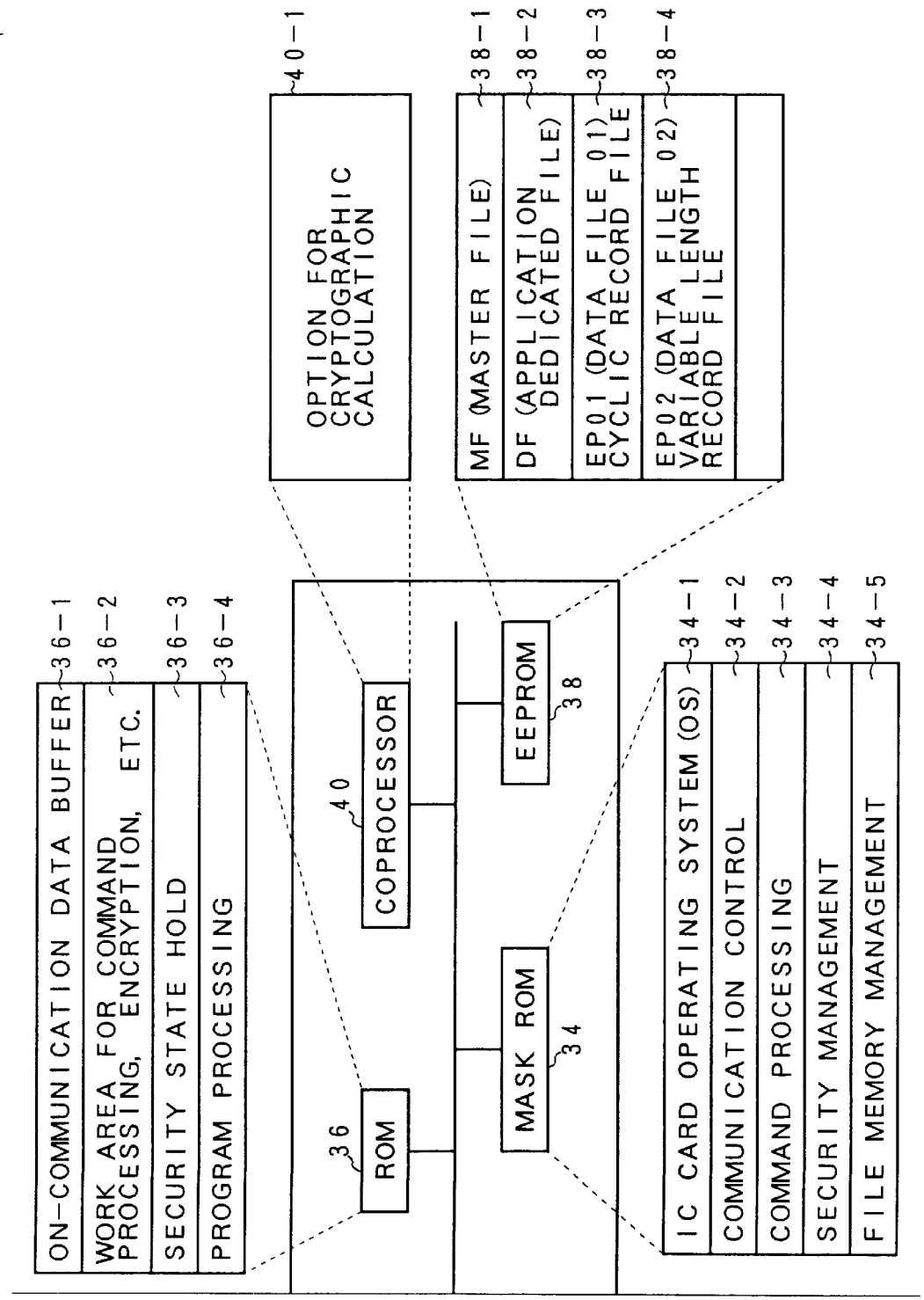

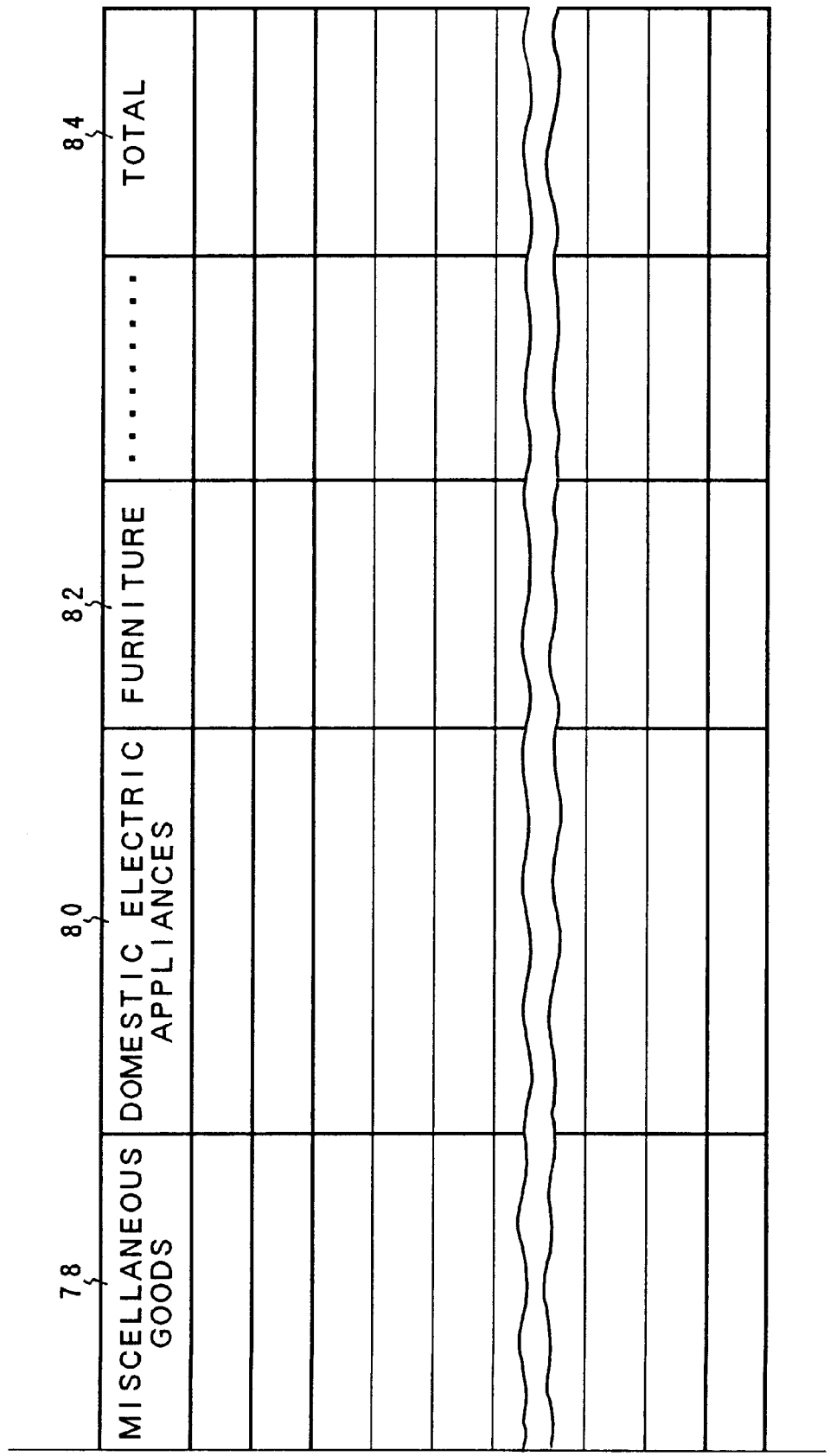
FIG. 4B

| 76 HEAVY CLOTHING | 78 MISCELLANEOUS GOODS | 80 DOMESTIC ELECTRIC APPLIANCES | 82 FURNITURE | ......  | 84 TOTAL |
|---|---|---|---|---|---|
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |

| DISCOUNT RATE [%] 94 | FOODS 72 | LIGHT CLOTHING 74 | HEAVY CLOTHING 76 | MISCELLANEOUS GOODS 78 | DOMESTIC ELECTRIC APPLIANCES 80 | FURNITURE 82 | ......... |
|---|---|---|---|---|---|---|---|
| 01 | | | | | | | |
| 02 | | | | | | | |
| 03 | | | | | | | |
| 04 | | | | | | | |
| 05 | | | | | | | |
| 06 | | | | | | | |
| 07 | | | | | | | |
| 08 | | | | | | | |
| 09 | | | | | | | |
| 10 | | | | | | | |

46

| DISCOUNT RATE [%] 94 | FOODS 72 46-11 |
|---|---|
| 01 | LESS THAN ¥3,000 |
| 02 | ¥3,000 OR MORE AND LESS THAN ¥5,000 |
| 03 | ¥5,000 OR MORE AND LESS THAN ¥8,000 |
| 04 | ¥8,000 OR MORE AND LESS THAN ¥10,000 |
| 05 | ¥10,000 OR MORE AND LESS THAN ¥20,000 |
| 06 | ¥20,000 OR MORE AND LESS THAN ¥30,000 |
| 07 | ¥30,000 OR MORE AND LESS THAN ¥50,000 |
| 08 | ¥50,000 OR MORE AND LESS THAN ¥70,000 |
| 09 | ¥70,000 OR MORE AND LESS THAN ¥100,000 |
| 10 | MORE THAN ¥100,000 |

FIG. 7

| DISCOUNT RATE [%] | FOODS |
|---|---|
| 01 | LESS THAN 5 TIMES |
| 02 | 5 TIMES OR MORE AND LESS THAN 10 TIMES |
| 03 | 10 TIMES OR MORE AND LESS THAN 15 TIMES |
| 04 | 15 TIMES OR MORE AND LESS THAN 20 TIMES |
| 05 | 20 TIMES OR MORE AND LESS THAN 30 TIMES |
| 06 | 30 TIMES OR MORE AND LESS THAN 40 TIMES |
| 07 | 40 TIMES OR MORE AND LESS THAN 50 TIMES |
| 08 | 50 TIMES OR MORE AND LESS THAN 100 TIMES |
| 09 | 100 TIMES OR MORE AND LESS THAN 150 TIMES |
| 10 | MORE THAN 150 TIMES |

F I G. 1 0

| PLU CODE | PRICE | CLASSIFICATION |
|---|---|---|
| 4910101000013 | 3,000 | 2 |
| 4910101000018 | 500 | 2 |
| 4910101000024 | 7,500 | 2 |
| 4910101000050 | 1,200 | 2 |
| 4910101000064 | 600 | 2 |

| GENRE | LIFELONG CUMULATIVE TOTAL | NEW TABLE |
|---|---|---|
| 1 | LESS THAN ¥1,000,000 | 1% |
| | ¥1,000,000 OR MORE AND LESS THAN ¥3,000,000 | 2% |
| | ¥3,000,000 OR MORE AND LESS THAN ¥5,000,000 | 3% |
| | ¥5,000,000 OR MORE AND LESS THAN ¥10,000,000 | 4% |
| | MORE THAN ¥10,000,000 | 5% |
| 2 | LESS THAN ¥1,000,000 | 1% |
| | ¥1,000,000 OR MORE AND LESS THAN ¥2,000,000 | 2% |
| | ¥2,000,000 OR MORE AND LESS THAN ¥3,500,000 | 3% |
| | ¥3,500,000 OR MORE AND LESS THAN ¥5,000,000 | 4% |
| | MORE THAN ¥5,000,000 | 5% |

FIG.12A 44-11

| DISCOUNT RATE [%] | FOODS | 72 |
|---|---|---|
| 01 | LESS THAN ￥3,000 | |
| 02 | ￥3,000 OR MORE AND LESS THAN ￥5,000 | |
| 03 | ￥5,000 OR MORE AND LESS THAN ￥8,000 | |
| 04 | ￥8,000 OR MORE AND LESS THAN ￥10,000 | |
| 05 | ￥10,000 OR MORE AND LESS THAN ￥20,000 | |
| 06 | ￥20,000 OR MORE AND LESS THAN ￥30,000 | |
| 07 | ￥30,000 OR MORE AND LESS THAN ￥50,000 | |
| 08 | ￥50,000 OR MORE AND LESS THAN ￥70,000 | |
| 09 | ￥70,000 OR MORE AND LESS THAN ￥100,000 | |
| 10 | MORE THAN ￥100,000 | |

| 94 DISCOUNT RATE [%] | FOODS 72 |
|---|---|
| 01 | --- |
| 02 | --- |
| 03 | LESS THAN ￥8,000 |
| 04 | ￥8,000 OR MORE AND LESS THAN ￥10,000 |
| 05 | ￥10,000 OR MORE AND LESS THAN ￥20,000 |
| 06 | ￥20,000 OR MORE AND LESS THAN ￥30,000 |
| 07 | ￥30,000 OR MORE AND LESS THAN ￥50,000 |
| 08 | ￥50,000 OR MORE AND LESS THAN ￥70,000 |
| 09 | ￥70,000 OR MORE AND LESS THAN ￥100,000 |
| 10 | MORE THAN ￥100,000 |

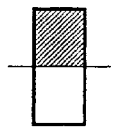
FIG. 13A
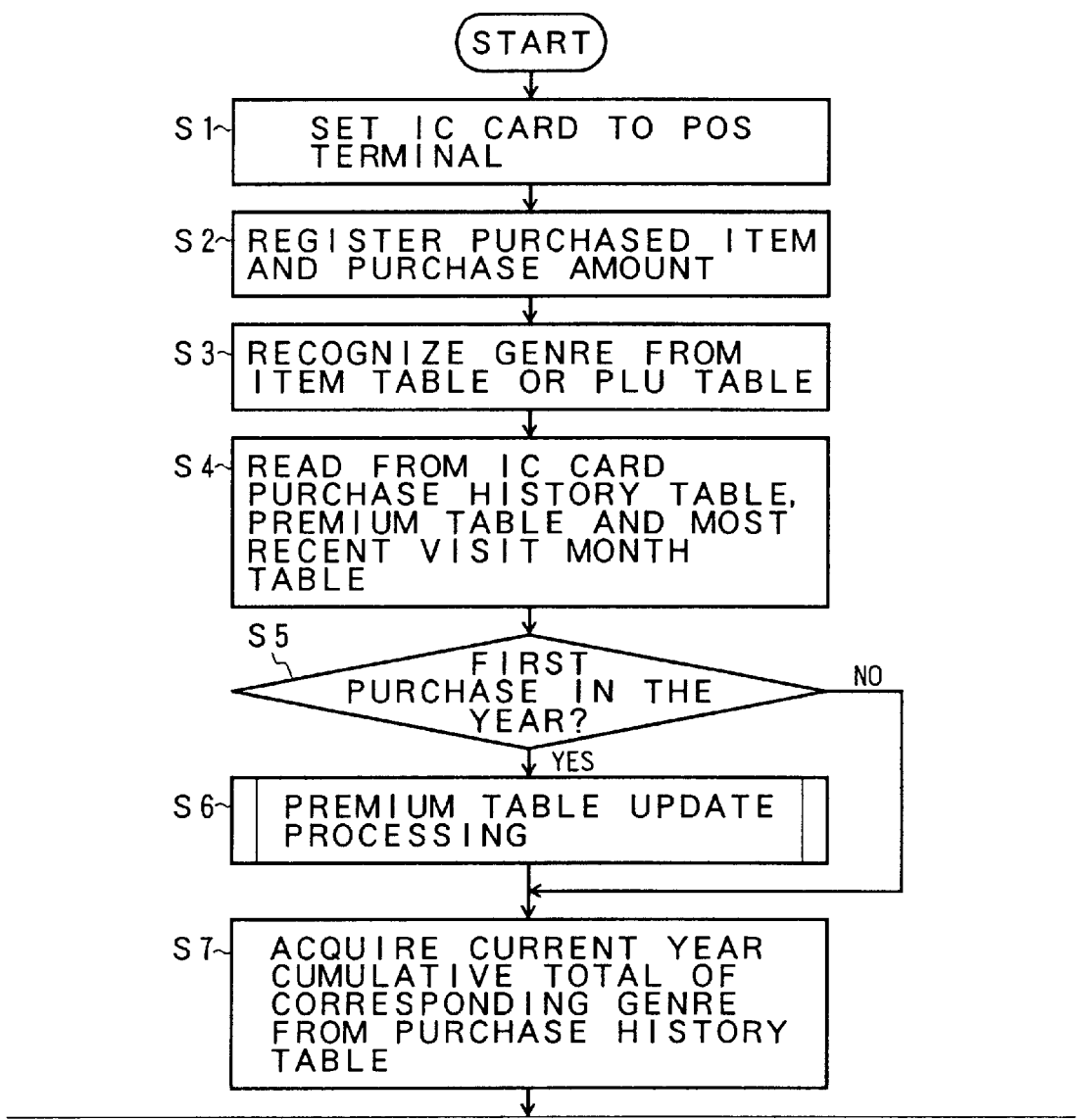

FIG. 13B
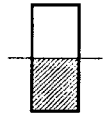
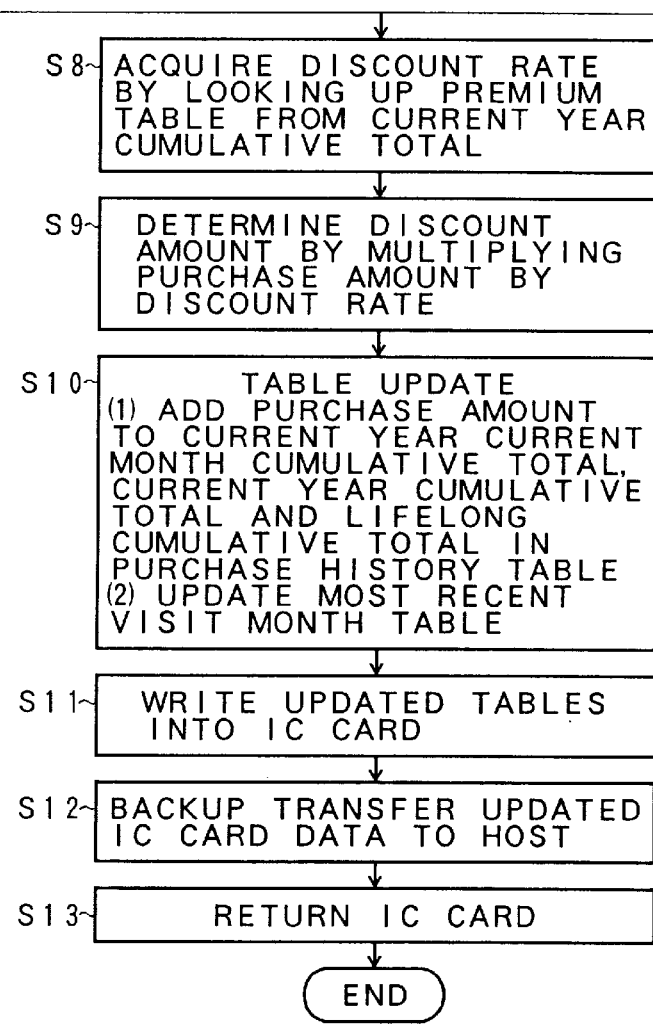

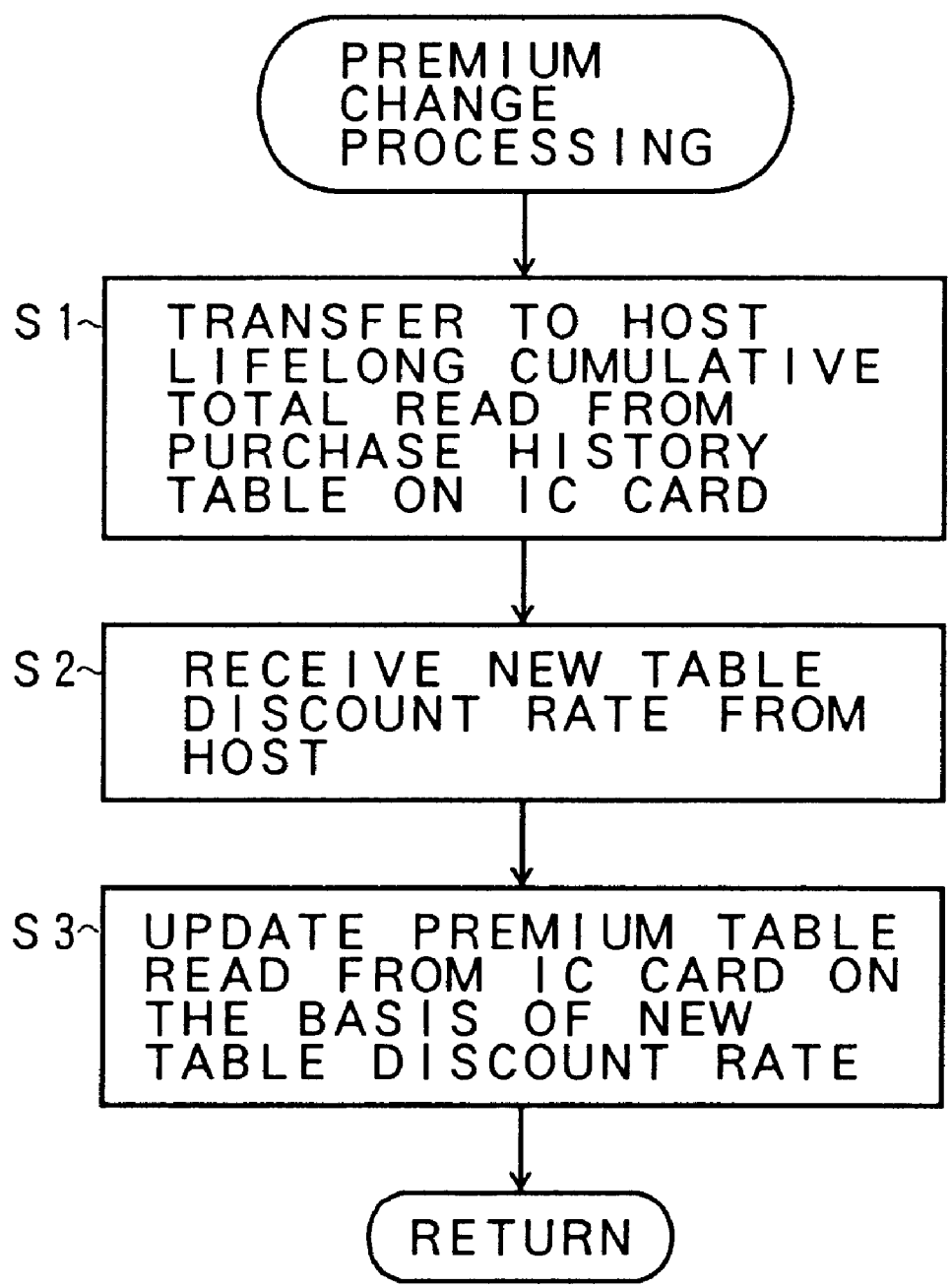

| POINT-UP RATE [%] 112 | FOODS 72 46-11 |
|---|---|
| 01 | LESS THAN ¥3,000 |
| 02 | ¥3,000 OR MORE AND LESS THAN ¥5,000 |
| 03 | ¥5,000 OR MORE AND LESS THAN ¥8,000 |
| 04 | ¥8,000 OR MORE AND LESS THAN ¥10,000 |
| 05 | ¥10,000 OR MORE AND LESS THAN ¥20,000 |
| 06 | ¥20,000 OR MORE AND LESS THAN ¥30,000 |
| 07 | ¥30,000 OR MORE AND LESS THAN ¥50,000 |
| 08 | ¥50,000 OR MORE AND LESS THAN ¥70,000 |
| 09 | ¥70,000 OR MORE AND LESS THAN ¥100,000 |
| 10 | MORE THAN ¥100,000 |

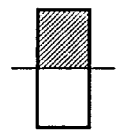
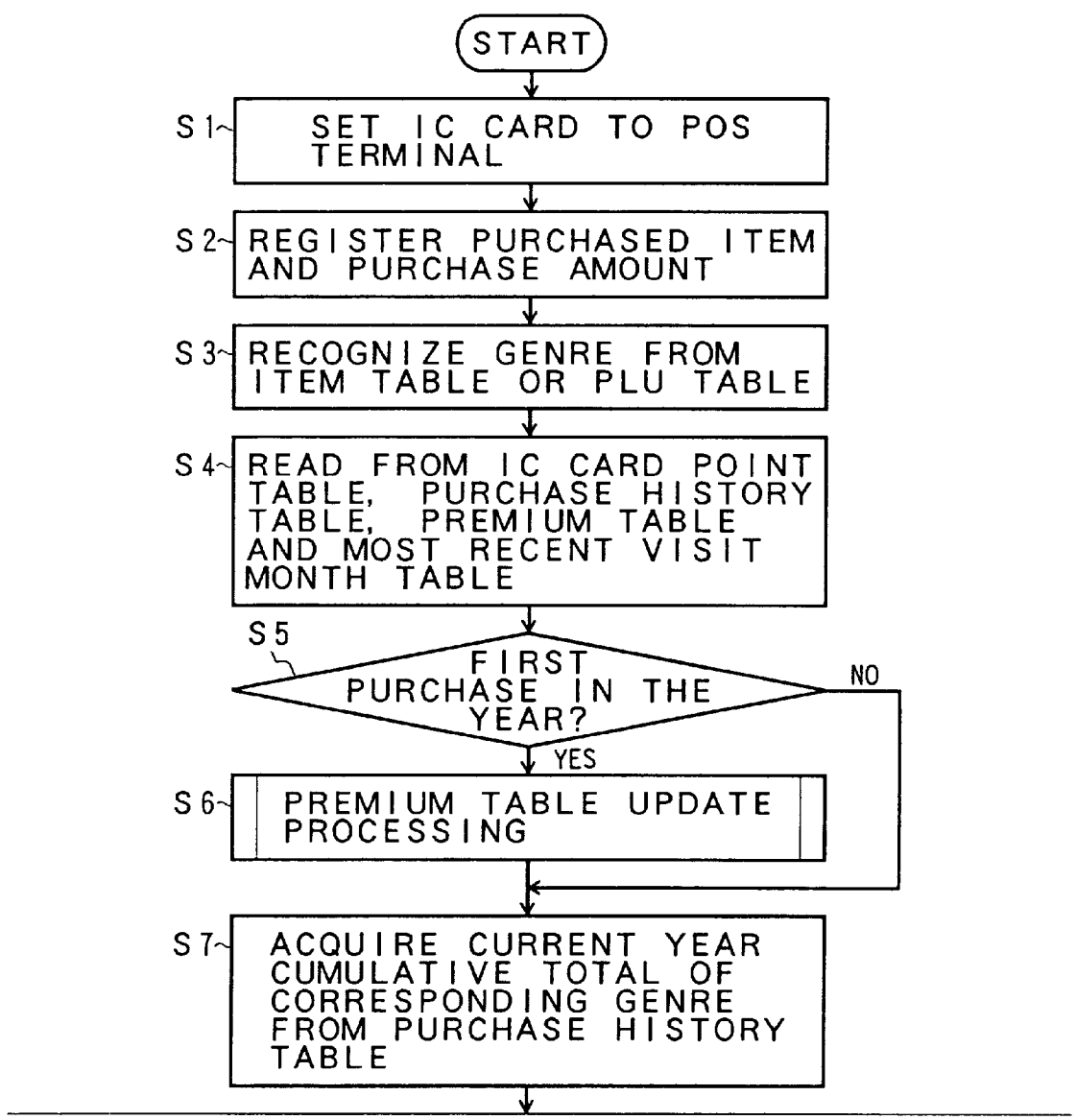
FIG. 17A

FIG. 19

| 122 | RELATION | CONJUGAL | PARENT AND CHILD | RELATIVES | OTHERS |
|---|---|---|---|---|---|
| 124 | SAME GENRE | 95% | 90% | 85% | 70% |
| 126 | DIFFERENT GENRE | 90% | 80% | 70% | 60% |

| TRANSFEROR / TRANSFEREE (128/130) | GENRE 1 | GENRE 2 | GENRE 3 | GENRE 4 |
|---|---|---|---|---|
| GENRE 1 |  | 95% | 90% | 90% |
| GENRE 2 | 80% |  | 90% | 90% |
| GENRE 3 | 70% | 75% |  | 75% |
| GENRE 4 | 70% | 70% | 75% |  |

FIG. 21

| TRANSFEROR<br>TRANSFEREE | GENRE 1 | GENRE 2 | GENRE 3 | GENRE 4 |
|---|---|---|---|---|
| GENRE 1 |  | 75% | 70% | 70% |
| GENRE 2 | 60% |  | 70% | 70% |
| GENRE 3 | 50% | 55% |  | 55% |
| GENRE 4 | 50% | 50% | 55% |  |

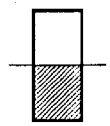
FIG. 22B
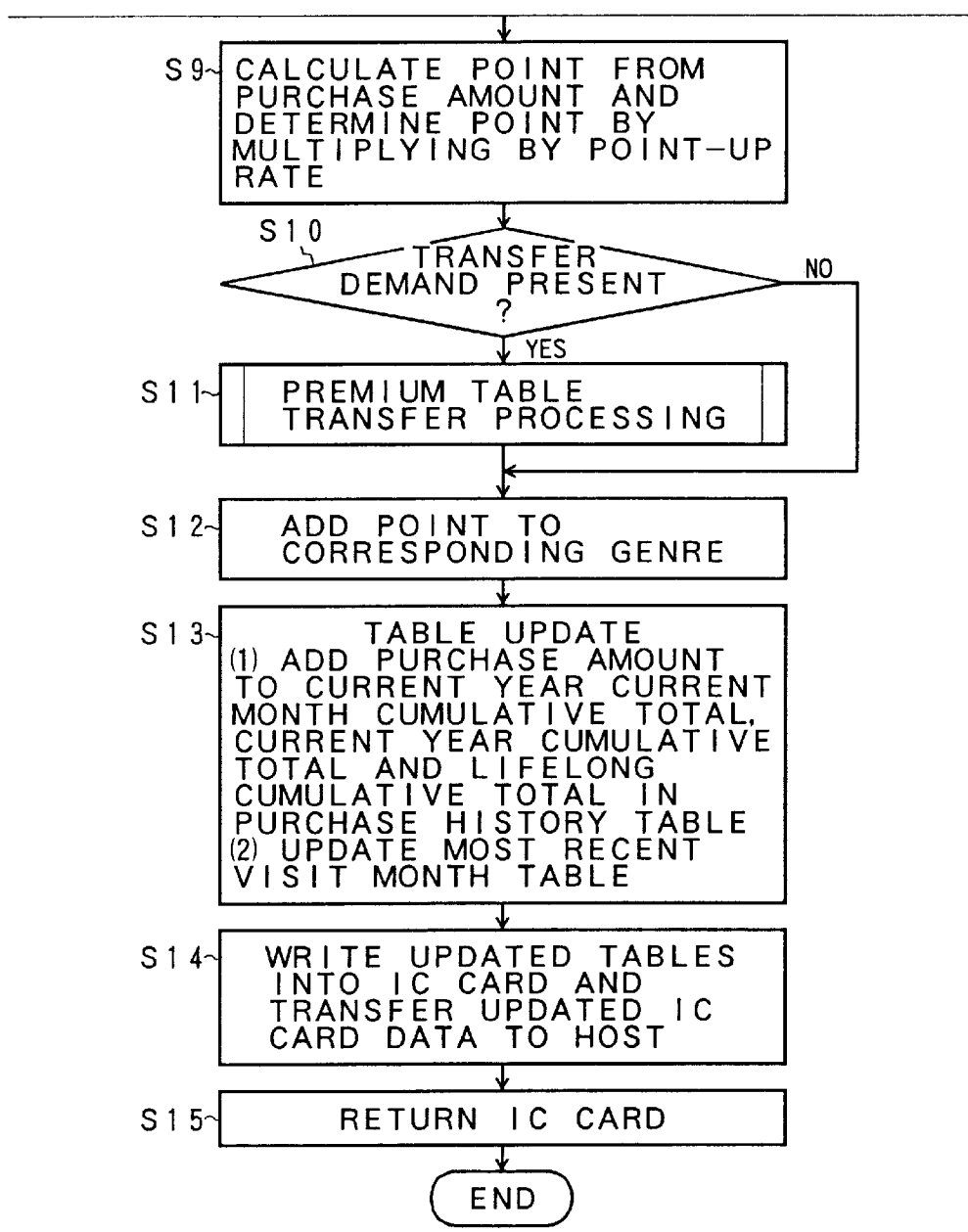

CUSTOMER SERVICE APPARATUS, METHOD AND CARD, AND COMPUTER READABLE RECORD MEDIUM HAVING CUSTOMER SERVICE PROCESSING PROGRAM RECORDED THEREON

BACKGROUND OF THE INVENTION

1. Field of the Invention

The present invention relates generally to a customer service apparatus, method and card for providing customers with premiums such as discounts or points by utilizing IC cards, and to a computer readable record medium on which a customer service processing program is recorded. More specifically, it relates to a customer service apparatus, method and card for providing customers with appropriate services corresponding to the degree of contribution of the customers, and to a computer readable record medium having thereon recorded a customer service processing program.

2. Description of the Related Arts

The distribution industry including department stores, supermarkets and shopping districts has been planning ways to increase the sales through advertising activities using newspaper fliers or direct mails to customers or through various customer acquiring activities or customer services such as stamp or point services. With the progress toward diversification in the purchasing activities of the consumers, however, conventional methods are growing less effective year by year. Thus, there is a need for creation of a new customer service achieving a shift from provision of a uniform customer service to provision of a fair service based on the degree of contribution of individual customers. On the other hand, advanced computer systems or electronics equipment and prevailing information networks have made it possible to employ a marketing method analyzing and utilizing the customer data, contributing greatly to an increase of sales. This needs a vast investment in order to build up a large-scale information network including building of a network for collecting customer information, provision of data storage for storing the collected customer data, introduction of a computer system for analyzing the customer data, securement of a flexible physical distribution system for realizing a rich assortment of goods corresponding to the analyzed customer data.

Such a conventional customer service was uniform and inflexible, making it hard to take measures depending on the degree of contribution. This allows the same service to be provided to unfamiliar customers as well, preventing customers from being rewarded with a return of money due to his/her large purchase amount and purchases frequency. In a case of an advertisement with a coupon of newspaper or fliers out of which the coupon is cut and carried to accept a service, the value is instantly returned to only the customer carrying the coupon, which may be cumbersome. Furthermore, increased usage of a magnetic card or the like has allowed initiation of a service for returning a profit in response to the degree of contribution. However, a uniform return of value is effected in such a manner that for example a 5% of discount rate is imparted to the total purchase amount. This makes it difficult to achieve a return corresponding to the commodity characteristics presenting different profits, which tends to increase costs to. Furthermore, to provide a service depending on the degree of contribution, the rate of may be set to several stages in accordance with the total purchase amount. The discount rate for example may be set such that 3% is given for less than ¥200,000, 5% for ¥200,000 or more and less than ¥500,000, 7% for ¥500,000 or more and less than ¥1,000,000 and 10% for ¥1,000,000 or more. However, this allows by no means a return corresponding to the commodity characteristics presenting different profits. In addition, the return of profits is made based on the results of the previous year for example of the total purchase amount which is an criterion of the degree of contribution, which may adversely affect the profit since the same level of purchase is not necessarily ensured in the current year. From a viewpoint of users, points acquired as a return of money spent are usable at a limited number of places by a limited number of persons, thereby preventing users from receiving the full benefit of the acquired points.

SUMMARY OF THE INVENTION

According to the present invention, there is provided a customer service apparatus capable of achieving a return of value through the utilization of the IC card with appropriate consideration for the level of expenditures by the customers and for the characteristics of the items purchased.

Furthermore, according to the present invention, there is provided a customer service apparatus ensuring for the users a full opportunity to accept the merit of acquired return profits such as points by imparting transferability to the point or other premiums acquired by the customers in accordance with the degree of contribution.

The customer service apparatus of the present invention comprises a carriable IC card and a service processing unit provided in a POS terminal or the like.

The IC card has a built-in integrated circuit including a processor and a memory, the memory storing therein purchase history information having purchase results recorded on a genre-to-genre basis and premium information having premium values defined in accordance with the purchase results on a genre-to-genre basis. The service processing unit refers to the purchase history information of the card on the basis of a genre of a purchased commodity to acquire purchase results and further refers to the premium information of the card on the basis of the acquired purchase results to acquire corresponding premium values, thereby providing discount services or points in conformity with the acquired premium values. Herein, the genre is defined by commodities or areas. The commodity genre includes foods, light clothing, heavy clothing, miscellaneous goods, domestic electric appliances, furniture and others. The area genre includes regions, stores, floors and counters. The purchase history information of the IC card includes the lifelong cumulative total, the previous year cumulative total, the current year monthly cumulative total and the current year cumulative total of the purchase amount recorded on a genre-to-genre basis. The purchase history information of the card may include the lifelong cumulative number of times, the previous year cumulative number of times, the current year monthly cumulative number of times and the current year cumulative number of times of the visit number of times recorded on a genre-to-genre basis. In case the premium information of the IC card includes discount rates defined in accordance with the purchase results, the service processing unit multiplies the purchase mount with a discount rate acquired from the premium information upon the purchase to determine the amount billed, the service processing unit further updating purchase result information of the card. In case the purchase history information of the card has points recorded in accordance with the purchase results on a genre-to-genre basis, the premium information having point-up rates defined in accordance with the purchase results, the service processing unit multiplies a point obtained by applying a unit point to the purchase amount, e.g., obtained from one point/¥1,000 by a point-up rate acquired from the premium information to determine a point and adds the determined point to the existing point of purchase result information of the IC card. The service processing unit includes an item table having thereon defined commodity item codes, items and genres and includes a price look-up table having thereon defined price look-up codes, prices and genres, the service processing unit acquiring a genre of a purchased commodity from the item table or the price look-up table. The memory of the IC card further stores most recent visit month information therein. In this case, the service processing unit recognizes a most recent visit month from the IC card and refers to the premium information based on the previous month cumulative total of the purchase history information to determine a premium value. The service processing unit updates the premium information on the basis of the purchase history information of the IC card. For example, upon a first purchase within a predetermined period, the service processing unit updates the premium information on the basis of the purchase result information of the card. Upon a first purchase in a year, the service processing unit updates the premium information on the basis of the lifelong result recorded in the purchase result information of the IC card. The customer service apparatus of the present invention is capable of performing a transfer of the return profits in accordance with the degree of contribution recorded on the IC card. To this end, the memory of the card further stores therein conversion information (a conversion table) defining conversion rates upon a transfer of premium values of the premium table to another IC card. In a manner corresponding to this, the POS system comprises a premium transfer processing unit which multiplies the premium value of a transferor IC card by a conversion rate of the conversion information for executing a transfer of premium values to a transferee IC card. The conversion information of the IC card includes conversion rates defined in accordance with the relations between the possessors of a transferor IC card and a transferee IC card. For example, the conversion information of the IC card includes conversion rates defined in accordance with the relationships between the possessors, e.g., the relations such as conjugal, parent and child, relatives and others. Furthermore, the conversion information of the IC card includes conversion rates defined in a manner separating a transfer within the same genre from a transfer between different genres. The service processing unit comprises a premium transfer processing unit which is provided with conversion information defining conversion rates for converting premium values of each genre into premium values of the other genres and which multiplies a premium value determined upon the purchase of a commodity by the conversion rate for the conversion into a premium value of the other genre to thereby update the premium information. The premium transfer processing unit defines the conversion information in the form of conversion information for a premium transfer within the same company or within the same company group. The premium transfer processing unit defines the conversion information in the form of conversion information for a premium transfer between the different companies or between the different company groups.

According to the present invention, there is provided a customer service method capable of achieving a return of profits through the utilization of the IC card with appropriate consideration for the degree of contribution of the customers and for the commodity characteristics. This customer service method comprises the following steps of:

referring to purchase history information of the card with a built-in integrated circuit including a processor and a memory on the basis of a genre of a purchased commodity, to acquire a purchase result;

referring to premium information of the card on the basis of the acquired purchase result, to acquire a corresponding premium value; and providing a service as a function of the acquired premium value.

Herein, the customer service method further comprises the steps of recording, into the IC card, conversion information defining conversion rates for a transfer of premium values of the premium information to another IC card; and multiplying a premium value of a transferor IC card by a conversion rate of the conversion information to execute a transfer of the premium value to a transferee IC card.

According to the present invention, there is provided an IC card itself for use in the customer service apparatus or in the customer service method, which are capable of achieving a return of profits through the utilization of the IC card with appropriate consideration of the degree of contribution of the customers and for the commodity characteristics. This IC card comprises a memory which stores therein purchase history information having purchase results recorded on a genre-to-genre basis and premium information having premium values defined in accordance with purchase results on a genre-to-genre basis. The purchase history information of the IC card includes the lifelong cumulative total, the previous year cumulative total, the current year monthly cumulative total and the current year cumulative total of the purchase amount or the visit number of times recorded on a genre-to-genre basis. The memory of the IC card stores therein conversion information defining conversion rates for the transfer of premium values of the premium information into another IC card.

According to the present invention, there is provided a computer readable record medium having thereon recorded a customer service processing program which is capable of achieving a return of profits through the utilization of the IC card with appropriate consideration for the degree of contribution of the customers and for the commodity characteristics. The customer service processing program recorded on the record medium refers to purchase history information of a card with a built-in integrated circuit including a processor and a memory on the basis of a genre of a purchased commodity to acquire a purchase result. The customer service processing program further refers to premium information of the card on the basis of the acquired purchase result to acquire a corresponding premium value and provides a service as a function of the acquired premium value.

According to such a customer service apparatus, method, card and computer readable record medium having a customer service processing program recorded thereon of the present invention, a concentrated service can be provided to regular customers having a high degree of contribution due to the large purchase amount or the large visit number of times. The present invention is also capable of obviating a vain expenditure on unfamiliar customers who may intend to purchase a commodity at a net price, thereby preventing a reduction of profits. The present invention is further capable of providing an appropriate service corresponding to the commodity characteristics yielding different profits in such a manner that even the regular customers are provided with less or unchanged service for the genre having a low degree of contribution. Naturally, for genres having a high degree of contribution, the regular customer can be blessed with more enriched service in accordance with the degree of contribution. It is also possible to provide an effective direct mailing service through sending of direct mails to appropriate targets by analyzing the degree of contribution, thereby allowing an improvement in the hit ratio, resulting in a reduction of vain direct mails and in a reduction of costs. It is also possible to introduce appropriate events to the customers by analyzing the degree of contribution. The present invention further allows a transfer of the premium imparted to the customers as a return of profit, thereby enabling the customers to enhance the conveniences and effectiveness of the acquired premium. Furthermore, provision of appropriate conversion rates upon the transfer allows a weighting of the transfer between individuals in response to the individual relations, preventing a transfer of excessive service when the premium is transferred between the companies. In addition, introduction into the conversion rates of area characteristics ensures an appropriate transfer of the premium between for example a main store and branches, thereby achieving a proper burden of costs.

The above and other objects, aspects, features and advantages of the present invention will become more apparent from the following detailed description with reference to the accompanying drawings.

BRIEF DESCRIPTION OF THE DRAWINGS

FIG. 1 is an explanatory diagram of a POS system to which the present invention is applied;

FIGS. 2A and 2B are explanatory diagrams of an IC card for use in the present invention;

FIGS. 4A and 4B are explanatory diagrams of a purchase history table based on the purchase amount, which is stored in the IC card of FIG. 3;

FIG. 7 is an explanatory diagram of a premium table having discount rates defined in accordance with the visit number of times stored in the IC card of FIG. 3;

FIG. 10 is an explanatory diagram of a price look-up table which is stored in the POS server of FIG. 3;

FIGS. 12A and 12B are explanatory diagrams of premium tables before and after updating, respectively, on the IC card, based on the premium rate table of FIG. 11;

FIGS. 13A and 13B are flowcharts of discount service processing effected in the embodiment of FIG. 3;

FIG. 14 is a detailed flowchart of premium updating processing of FIG. 13;

FIGS. 17A and 17B are flowcharts of point service processing effected in the embodiment of FIG. 3;

FIG. 19 is an explanatory diagram of a personal premium conversion table which is stored in an IC card of FIG. 18;

FIG. 20 is an explanatory diagram of an intra-company conversion table which is stored in a host and a POS server of FIG. 18;

FIG. 21 is an explanatory diagram of an inter-company conversion table which is stored in the host and the POS server of FIG. 18;

FIGS. 22A and 22B are flowcharts of point service processing allowing an inter-genre transfer, which is effected in the embodiment of FIG. 18;

DETAILED DESCRIPTION OF THE PREFERRED EMBODIMENTS

System Configuration and Hardware

Figure 3:
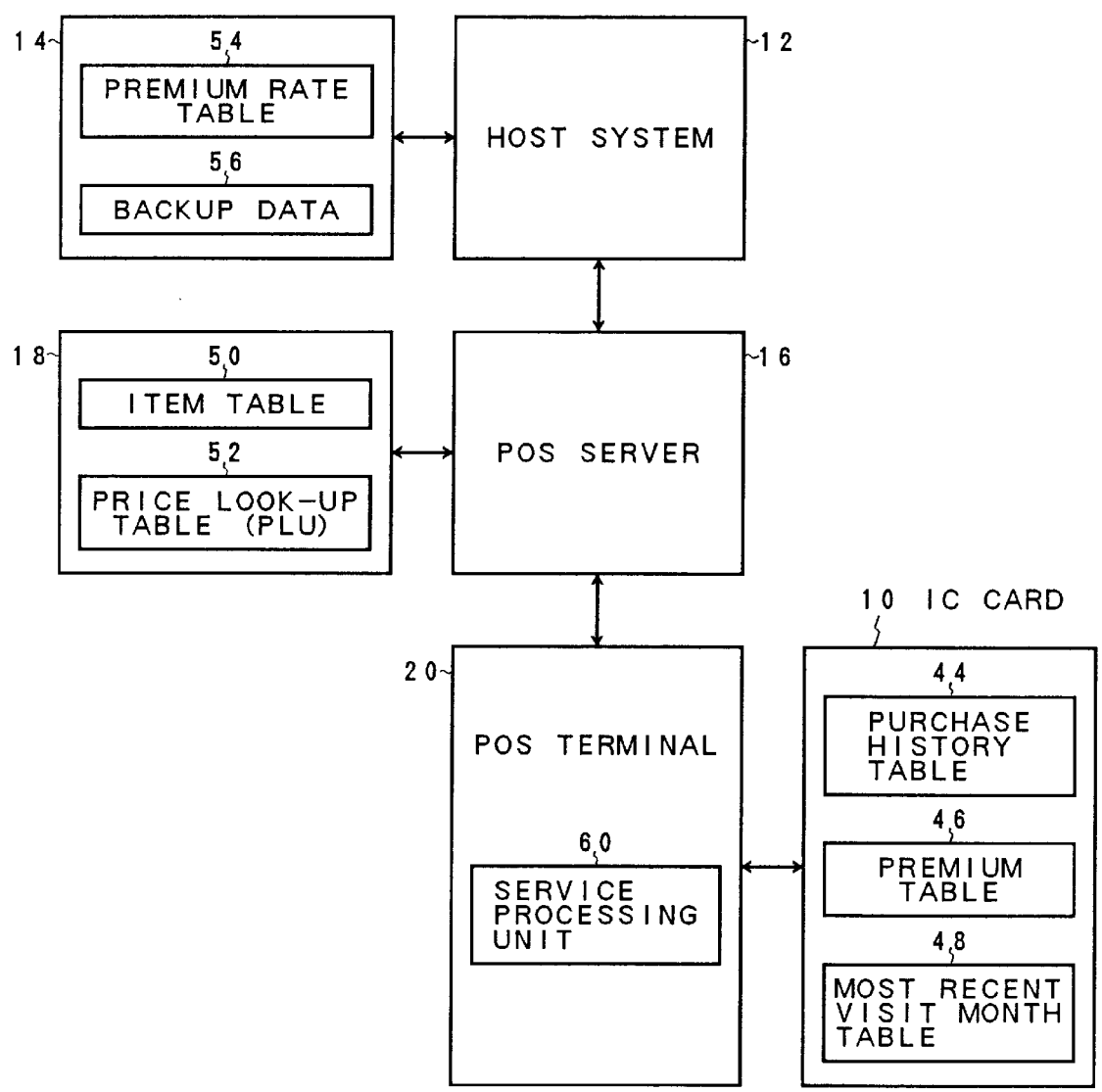
FIG. 3 is a function block diagram of an embodiment of the present invention.

FIG. 1 is an explanatory diagram of a POS system (point of service system) to which is applied a customer service apparatus in accordance with the present invention. The POS system comprises a host system 12, a host file apparatus 14, a POS server 16, a server file apparatus 18 and a plurality of POS terminals 20-1 and 20-2. Although this embodiment is a large-scale POS system by way of example, a medium-scale POS system can comprise the POS server 16, the server file apparatus 18 and the POS terminals 20-1 and 20-2. Furthermore, in case of a small-scale POS system for private concerns, etc., it can comprise only the POS terminals 20-1 and 20-2. Such a POS system is provided in department stores, convenience stores, private concerns, etc., to perform a settlement in cash or credit cards attendant on the purchases of commodities or provision of services to combine the results into a total. Corresponding to such a POS system, a customer 11 possesses an IC card 10 accessible by the POS system.

The IC card 10 has a structure and functions as shown in FIGS. 2A and 2B. The IC card 10 carries an IC module 22 thereon, which as shown in section below in an exclusive and enlarged manner includes a terminal substrate 24, an IC chip 26 disposed on the underside of the terminal substrate 24, bonding wires 28 connecting the substrate 24 and the IC chip 26, and a resin or other mold material 30 for sealing the IC chip 26 and the bonding wire 28 therein. The IC chip 26 includes as shown in dotted lines in an exclusive and enlarged manner a microprocessor (MPU) 32, a mask ROM 34, a RAM 36, an EEPROM 38, a coprocessor 40 and input/output port 42. The mask ROM 34 stores therein a program (OS) for the microprocessor 32 for providing a control of all the processing of the IC card 10 in such a manner that data are not erased in spite of a cutoff of the power and are not rewritable. The mask ROM 34 is provided for example with an IC card operating system 34-1, a communication control module 34-2, a command processing module 34-3, a security management module 34-4 and a file memory management module 34-5. The RAM 36 is a work memory for use in a data buffer work area, etc., of which storage data are erased by the cutoff of the power. The RAM 36 defines for example an on-communication data buffer 36-1, a work area 36-2 for command processing, encryption, etc., a security state hold area 36-3 and a program processing area 36-4. The nonvolatile EEPROM 38 stores data at a position determined in compliance with the IC card operating system 34-1 of the mask ROM 34. In this case, a file creation command lying in the IC card operating system 34-1 allows a free assignment of the file and security in conformity with the purposes of use of the application. Naturally, the data are not erased in spite of the cutoff of the power. Rewriting of the data is possible under the management of the security management module 34-4. More specifically, the EEPROM 38 defines a master file 38-1, an application dedicated file 3802, an EP01 cyclic record file 38-3 and an EP02 variable length record file 38-4. The coprocessor 40 acts as an option 40-1 for cryptographic calculation. The input/output port 42 includes a power source port 42-1, a power source/signal port 42-2, a reset port 42-3, a clock port 42-4 and a communication input/output port 42-5. Such an IC card 10 conforms to business standards such as EMV specifications for example. Together with the IC card 10 there are also provided abundant related commodities such as an IC card reader/writer, a value service terminal, a balance reader and a smart access. Use can be made for example of a "smart card vision" supplied in the form of an IC card solution from Fujitsu Ltd. Naturally, any system utilizing an appropriate IC card is available without being limited to these.

FIG. 3 is a function block diagram in case the customer service apparatus of the present invention is applied to the POS system of FIG. 1. The memory of the IC card 10 possessed by a customer, for example the EEPROM 38 of FIGS. 2A and 2B store therein a purchase history table 44, a premium table 46 and a most recent visit month table 48. The purchase history table 44 records customer's purchase results according to genres. Main genres include a commodity genre and an area genre, although the content of the genres can be freely determined by service providing firms. This embodiment employs the commodity genre by way of example. The area genre includes for example areas such as Kanto, Kansai and Kyushu, prefectures, area branches and a main store. The same store can have genres such as floors and counters. The premium table 46 defines a premium value in accordance with purchase results for each genre recorded in the purchase history table 44. This embodiment employs the purchase amount and the visit number of times as the purchase results recorded in the purchase history table 44 by way of example. For this reason, the premium table 46 defines a premium value in accordance with the purchase amount or the visit number of times which is purchase results recorded in the purchase history table 44. The premium value defined in the present invention mainly includes a discount rate and a point value, although it may otherwise include a premium commodity, a travel coupon and a gift certificate. The most recent visit month table 48 updates at all times the most recent month when a customer has used the IC card 10 for the settlement of the purchased commodity or service. In a manner corresponding to such an IC card 10 possessed by the customer, the POS terminal 20 for example of the POS system is provided with a service processing unit 60. When a salesclerk accepts the IC card 10 from a customer to set it on the POS terminal 20 for executing an operation necessary for the settlement of a purchased commodity, the service processing unit 60 refers to the purchase history table 44 of the IC card 10 in accordance with the genre of the purchased commodity to acquire a purchase result of the customer, and refers to the premium table 46 of the IC card 10 on the basis of the acquired purchase result to acquire a premium value corresponding to the purchase result for providing a service corresponding to the acquired premium value. In case the service processing unit 64 provides a discount service for example, reference is made to the premium service table 46 based on the purchase amount to acquire a discount rate corresponding to the purchase amount. Settlement is then made by figuring out the amount obtained by multiplying the purchase amount by this discount rate. In case the service processing unit 60 provides a point service, the point number is figured out from the actual purchase amount since the purchase amount per point is determined. The resultant point number is then multiplied by a point-up rate acquired from the premium table 46 to obtain a premium point number, which is then added to the existing point value. Furthermore, the service processing unit 60 updates the purchase results, more specifically the purchase amount and the visit number of times, of the purchase history table 44 of the IC card 10. The judgment of genre in the service processing unit 60 is made by utilizing an item table 50 or a price look-up table (PLU table) 52 stored in the server file apparatus 18 connected to the POS server 16. The item table 50 and the price look-up table 52 register therein genre type codes previously defined corresponding to the items or the commodity prices so that the genre type codes are obtained when the item table 50 or the price look-up table 52 is referred to upon the purchase of commodities. On the basis of this genre type code, judgment can be made of the genre in the purchase history table 44 of the IC card 10. In order to update to a new value the premium value in accordance with the purchase results of the premium table 46 stored in the IC card 10, use is made of a premium rate table 54 stored in the host file apparatus 14 of the host system 12. For example, the premium rate table 54 defines premium values in a plurality of stages in accordance with the lifelong results of the customer. When receiving an update request from the service processing unit 60 of the POS terminal 20 upon the first purchase in a year for example, the premium table 46 of the IC card 10 is updated so that if the lifelong result up to the previous year belongs to a next rank beyond the rank of the premium table 54, application is made of a premium value in the new rank. Furthermore, the host file apparatus 14 of the host system 12 stores therein backup data 56 of the IC card 10, with all table information of the purchase history table 44, the premium table 46 and the most recent visit month table 48 being transferred from the POS terminal 20 via the POS server 16 at the timing of the purchase processing using the IC card 10. This enables the most recent table information to be securely restored in the event of a breakage or loss of the IC card 10.

Discount Service

Figure 4A:
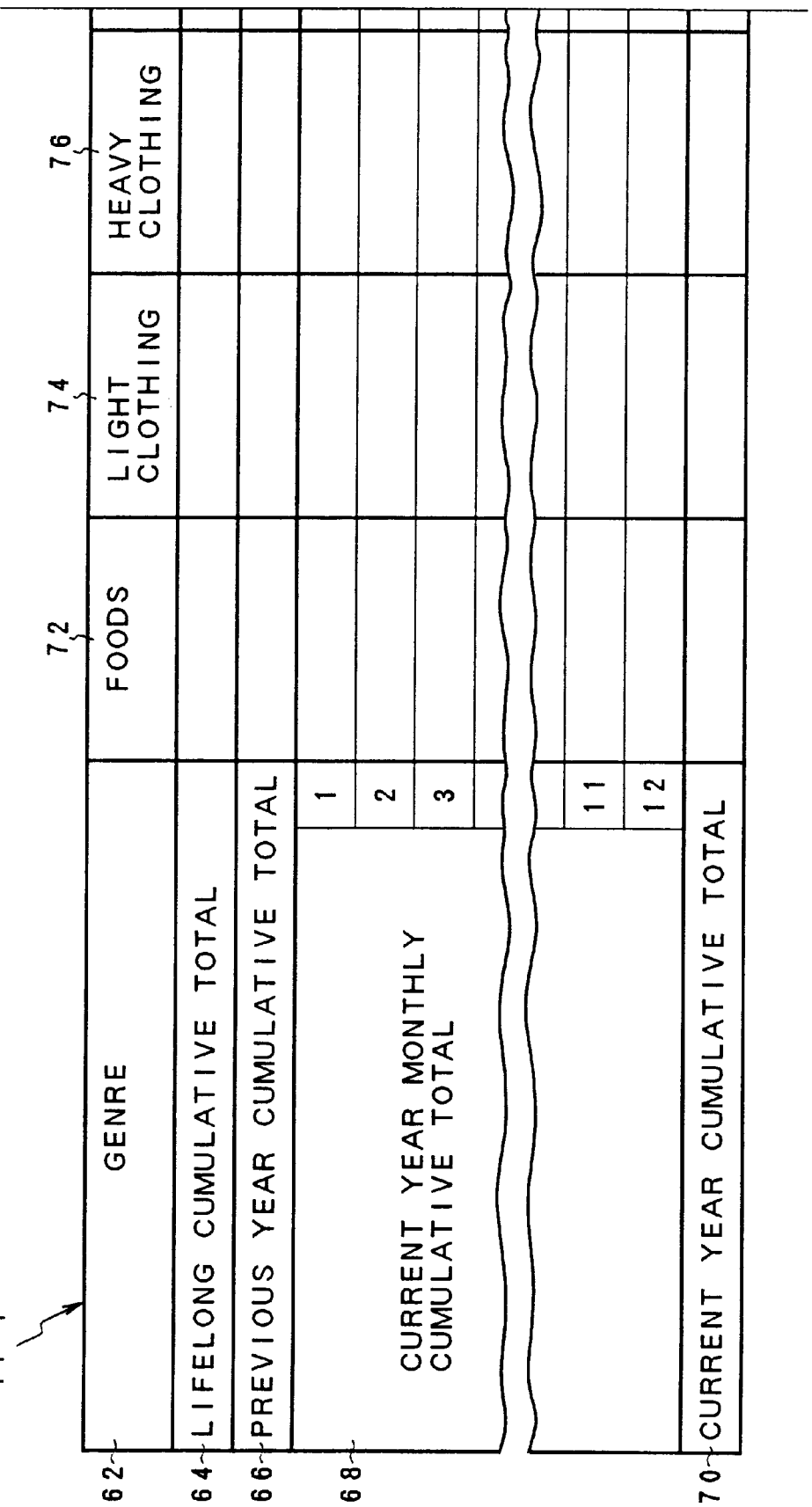

The embodiment of FIG. 3 will then be described in case a discount service is provided as a premium by way of example. FIGS. 4A and 4B are explanatory diagrams of a purchase history table on the IC card 10 of FIG. 3, taking a case where the purchase amount is recorded as purchase results by way of example. A purchase history table 44-1 having the purchase amount recorded as the purchase results has genres 62 in the form of item genres in this embodiment, which includes foods 72, light clothing 74, heavy clothing 76, miscellaneous goods 78, domestic electric appliances 80 and furniture 82. In a manner corresponding to the genres 62 in the form of the item genre, the purchase amount as the purchase results includes lifelong cumulative total 64, previous year cumulative total 66, current year monthly cumulative total 68 and current year cumulative total 70. These cumulative totals are recorded for each of the genres 62 including the foods 72 to the furniture 82, with total 84 representing the sum of all the genres. The current year monthly cumulative total 68 has twelve lines from January to December as shown at the time of December of the year, although it has a corresponding number of lines up to the current month in case of months other than December. Furthermore, there is no need to provide lines for months in which no purchases have occurred.

Figure 5A:
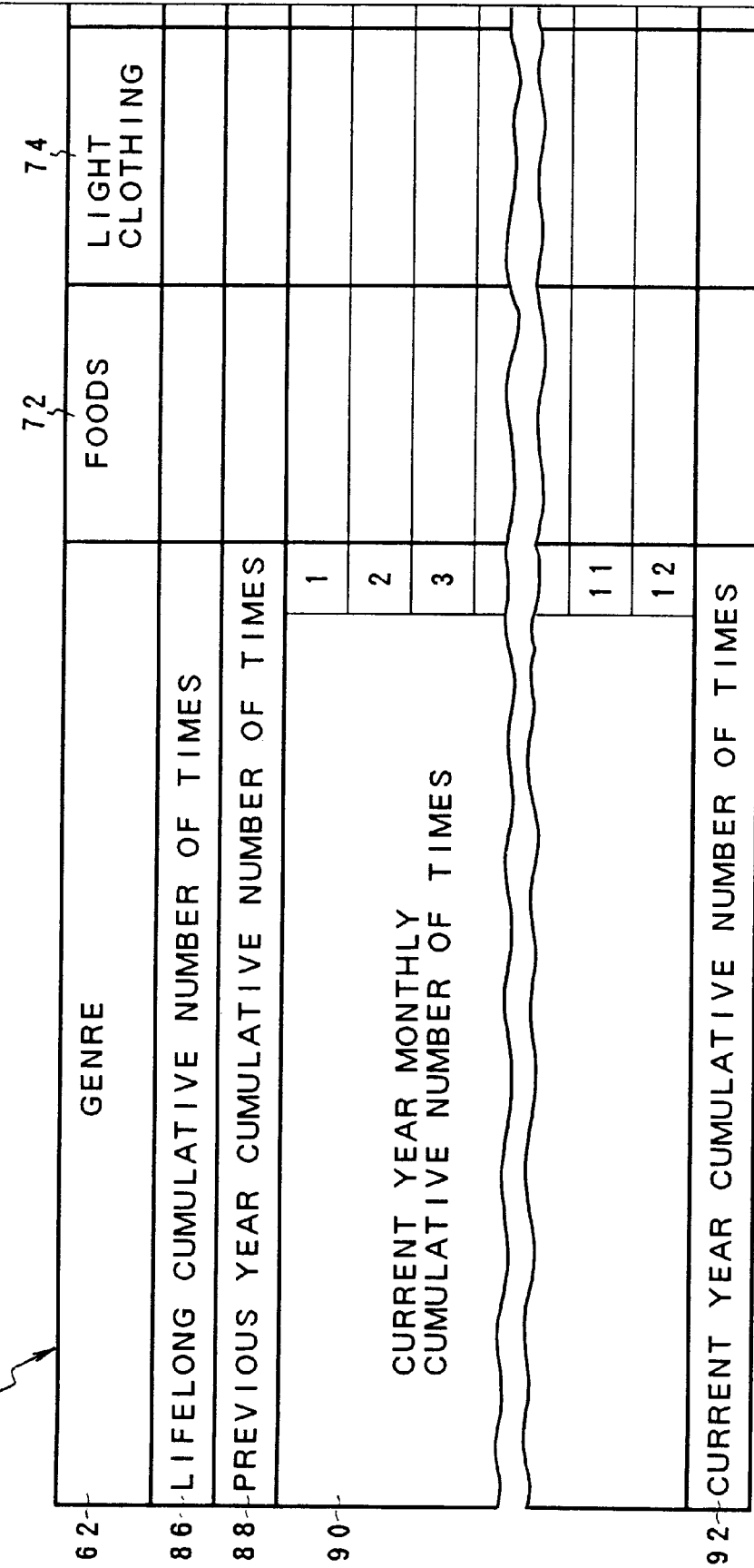
FIGS. 5A and 5B are explanatory diagrams of a purchase history table based on the visit number of times, which is stored in the IC card of FIG. 3.
Figure 5B:
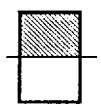

FIGS. 5A and 5B illustrate another embodiment of the purchase history table 44 of FIG. 3. The number of times of visit is recorded as the purchase results in this embodiment. A purchase history table 44-2 employing the number of times of visit as the purchase results has the genres 66 in the form of the item genres including the foods 72 to furniture 82, and the total 84 which are the same as those of the purchase history table 44-1 employing the purchase amount of FIGS. 4A and 4B. Below the genres 62, however, it has lifelong cumulative number of times 86, previous year cumulative number of times 88, current year monthly cumulative number of times 90 and current year cumulative number of times 92 in the mentioned order.

Figure 6A:
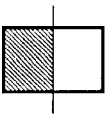
FIGS. 6A and 6B are an explanatory diagram of a premium table having discount rates defined in accordance with the purchase amount stored in the IC card of FIG. 3.
Figure 6B:
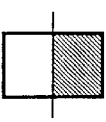

FIG. 6 is an explanatory diagram of the premium table 46 on the IC card 10 of FIG. 3 for use in the discount service. The premium table 46 has 1% to 10% of discount rates 94 designated at "01 to 10". In a manner corresponding to the discount rates 94, it has item genres including the foods 72, light clothing 74, heavy clothing 76, miscellaneous goods 78, domestic electric appliances 80 and furniture 82. The region of this premium table 46 includes a premium table 46-11 of the foods 72 as shown below in an exclusive and enlarged manner, which has the purchase amounts to which are applied the 1% to 10% of discount rates 94 in a corresponding manner. Although in the premium table 46-11 of the foods 72, the 1% to 10% of discount rates are correspondingly assigned to all the purchase amounts, some genres may have a minimum amount for the application of the discount rates or otherwise may have a maximum discount rate limited to 5% for example. Taking into consideration a profit of a commodity in the item genres, the relation of correspondence of the purchase amount to the discount rates in this premium table is so set as to ensure an appropriate return in accordance with the purchase amount which is the result of a customer's contribution.

FIG. 7 illustrates a premium table 46-21 of the region of the foods 72 of the premium table 46 of FIG. 6, which has discount rates defined in accordance with the number of times of visit which is the purchase results. This premium table 46-21 of the foods 72 employing the visit number of times as the purchase results has 1 to 10% of discount rates 94, corresponding to which the ranges of the visit number of times are defined as the purchase results.

Figure 8:
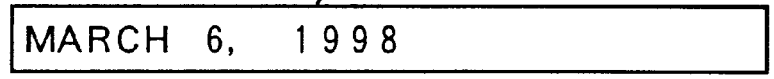
FIG. 8 is an explanatory diagram of a most recent visit month table which is stored in the IC card of FIG. 3.

FIG. 8 illustrates the most recent visit month table 48 on the IC card 10 of FIG. 3, which registers therein "Mar. 6, 1998" indicative of the most recent visit month for example. The service processing unit 60 of the POS terminal 20 of FIG. 3 refers to this most recent visit month table 48 on the IC card 10 so as to achieve an appropriate table management of the current year monthly cumulative total 68 or the current year monthly cumulative number of times 90 in the purchase history table 44-1 or 44-2 of FIGS. 4A and 4B or FIGS. 5A and 5B. In case the content of the most recent visit month table 48 is "Mar. 6, 1998" of FIG. 8 when a visit and purchase has occurred in May, 1998 for example, it is judged that there was no visit in April, 1998, clearing the table value for April. In case the discount rate of the premium table 46 of FIG. 6 is defined for example from the cumulative total (the degree of contribution) up to the previous month of the current year, the purchase history table 44-1 is referred to on the basis of the information of this most recent visit month table 48 to obtain the lifelong cumulative total or the lifelong cumulative number of times up to the previous month to thereby acquire a discount rate from the premium table 46.

Figure 9:
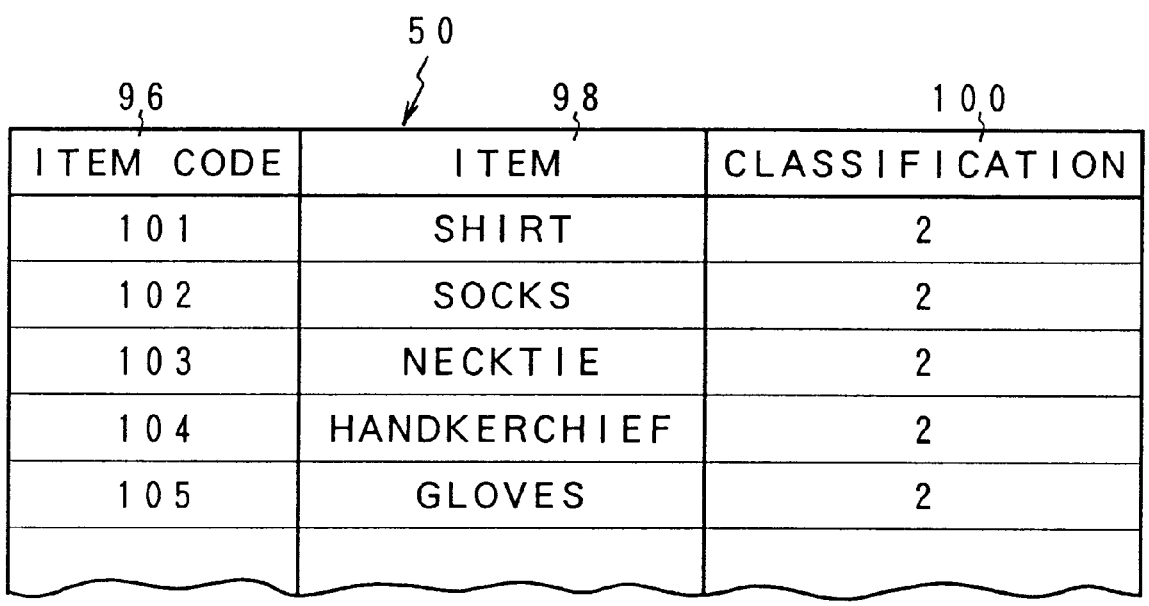
FIG. 9 is an explanatory diagram of an item table which is stored in a POS server of FIG. 3.

FIG. 9 is an explanatory diagram of the item table 50 stored in the server file apparatus 18 of FIG. 3. The item table 50 includes item code 96 and item 98, although it further includes classification code 100 in this embodiment. For example, the item "shirt" corresponding to the item code 101 has a classification code 2.

FIG. 10 is an explanatory diagram of the price look-up table 52 provided in the server file apparatus 18 of FIG. 3. This price look-up table 52 is a known price look-up table. The price look-up table 52 includes PLU code 102 and price 104, although it further includes classification 100 in this embodiment. The price look-up table 52 corresponds to the item table 50 of FIG. 9. For example, in a manner corresponding to the item code "101" and the item "shirt" of FIG. 9, there are provided the PLU code "4010101000013" and the price "¥3,000" as well as the classification code "2". In response to an input of a commodity name or a commodity code upon the purchase of the commodity, the service processing unit 60 of the POS terminal 20 posts the POS server 16 on it, allowing a reference to the item table 50 of FIG. 9 and the price look-up table 52 of FIG. 10, to thereby acquire the classification code 100 to specify a genre in the purchase history table 44.

Figure 11:
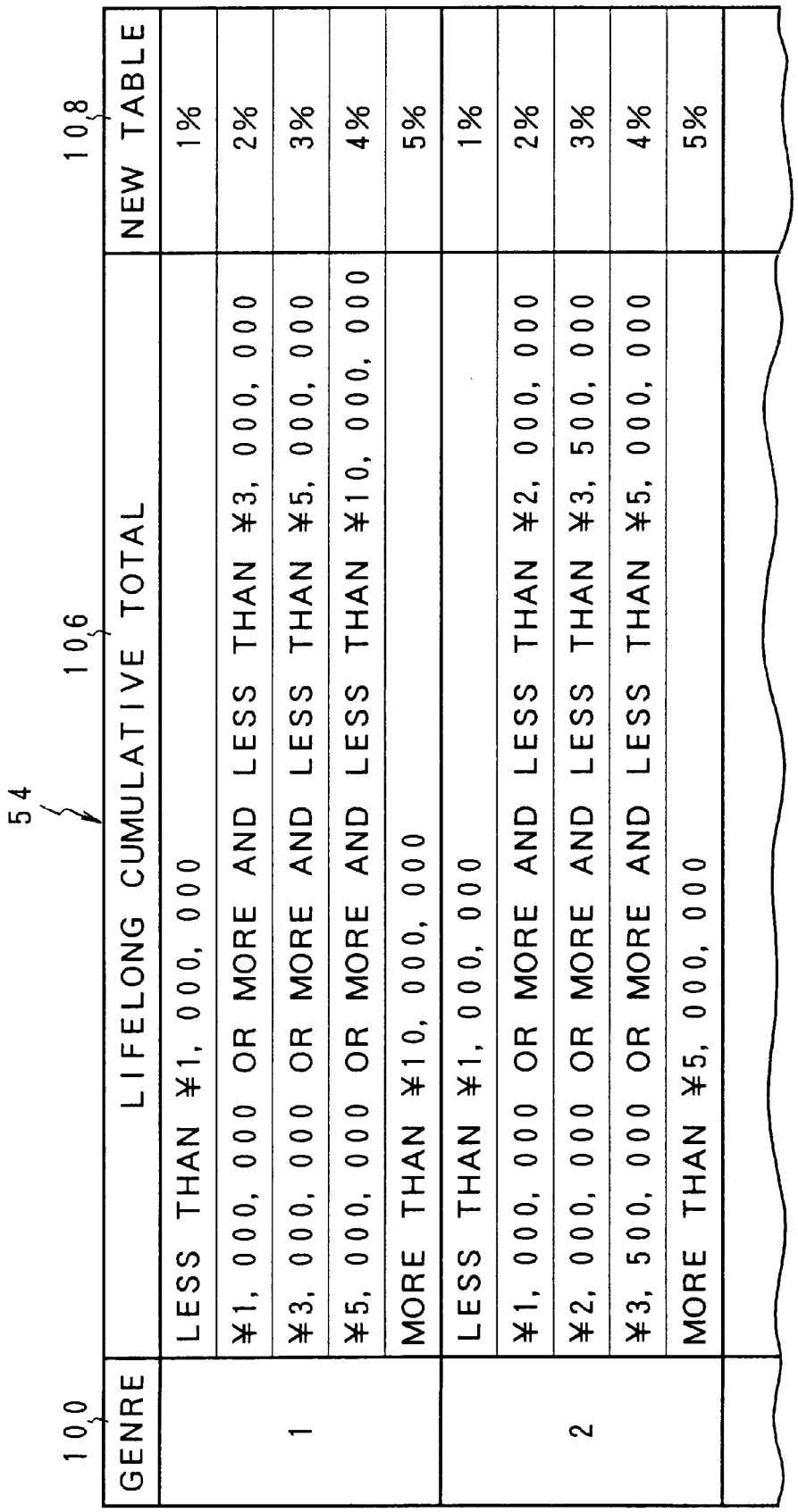
FIG. 11 is an explanatory diagram of a premium rate table which is stored in a host of FIG. 3.

FIG. 11 is an explanatory diagram of the premium rate table 54 stored in the host file apparatus 14 of FIG. 3. In a manner corresponding to the classification codes "1, 2, . . . " indicative of the genres 100, the premium rate table 54 has lifelong cumulative total 106 and new table discount rate 108. For example, the "foods" corresponding to the classification code "1"have five ranks from less than ¥1,000,000 to more than ¥5,000,000 on the basis of the lifelong cumulative total 106, defining 1% to 5% of new table discount rates for respective ranks. In case the lifelong cumulative total 106 is for example "less than ¥1,000,000", the new table discount rate 108 of 1% is applied, providing a minimum discount rate of 1% which is applied to "less than ¥3,000" in a premium table 44-11 as in FIG. 12A. When the lifelong cumulative total 106 in the premium rate table 54 of FIG. 11 reaches the rank " ¥3,000,000 or more and less than ¥5,000,000" due to the cumulation of the purchase results of the customer having the FIG. 12A premium table 44-11, the new table discount rate 108 of "3%" is provided. In the event of application of "3%" of the new table discount rate 108, the premium table 44-11 of FIG. 12A is updated to a premium table 44-12 of FIG. 12B. More specifically, the premium table 44-12 after updating has no amount columns corresponding to the discount rates 1% and 2%, allowing the minimum discount rate of 3% to be applied to "less than ¥8,000". This means that the premium table 44-12 after updating has the minimum discount rate increased to 3%.

Referring then to a flowchart of FIGS. 13A and 13B, description is made of the discount processing upon the purchase of a commodity effected by the service processing unit 60 provided in the POS terminal 20 of FIG. 3. First in step S1, a salesclerk accepts an IC card of a customer together with a purchased commodity, and sets the IC card on the POS terminal 20. Then in step S2, a bar code reader or a ten key is used to enter the purchased commodity name and the purchase amount for registration. Then in step S3, the POS server 16 is accessed to allow a reference to the item table 50 or the price look-up table 52 to thereby recognize the genre of the commodity. Then in step S4, the purchase history table 44, the premium table 46 and the most recent visit month table 48 are read for deployment from the IC card 10 into a work memory on the POS terminal 20. Naturally, instead of reading the table for deployment into the POS terminal 20, access may be made to the IC card 10 to read the content of the table as needed. Then in step S5 a check is made to see if the purchase is a first purchase in the current year from the content of the most recent visit month table 48. If it is the first purchase in the current year, then the procedure advances to step S6 for the execution of the premium table update processing.

This premium table update processing is effected as shown in a subroutine of FIG. 14. In step S1, a transfer to the host 12 is made of, e.g., the lifelong cumulative total read from the purchase history table 44 of the IC card 10. In step S2, a new table discount rate 108 of the associated genre is received from the premium rate table 54 shown in FIG. 11. Then in Step S3, the premium table 46 read from the IC card 10 is updated on the basis of the new table discount rate as in FIGS. 12A and 12B.

Referring again to FIGS. 13A and 13B, in step S7 the purchase history table 44-1 as in FIG. 4 for example is referred to on the basis of the genre obtained by the reference to the item table 50 or the PLU table 52 in step S3, to acquire the current year cumulative total 70 of the genre in question. Then in step S8, the premium table 46 of FIG. 6 is referred to on the basis of the thus acquired current year cumulative total, to acquire a discount rate. Then in step S9 the purchase amount is multiplied by the discount rate acquired from the premium table 46 to determine the discount amount to perform a settlement. Then in step S10, updating is made of the tables on the work memory read from the IC card. In case of the purchase history table 44-1 of FIG. 4 for example, to perform this table updating, the current purchase amount is added to the genres in question of the current month cumulative total of the current year monthly cumulative total 68, the current year cumulative total 70 and the lifelong cumulative total 64, with a further update of the most recent visit month table 48 of FIG. 8 to the date of the purchase date. After the completion of this table updating, the tables after updating are written to the IC card 10 in step S11. Then in step S12, the tables including the updated IC card data are backup transferred to the host for saving. After the completion of the above processing, the IC card 10 is returned to the customer in step S13, to complete a series of processes.

Point Service

Figure 15A:
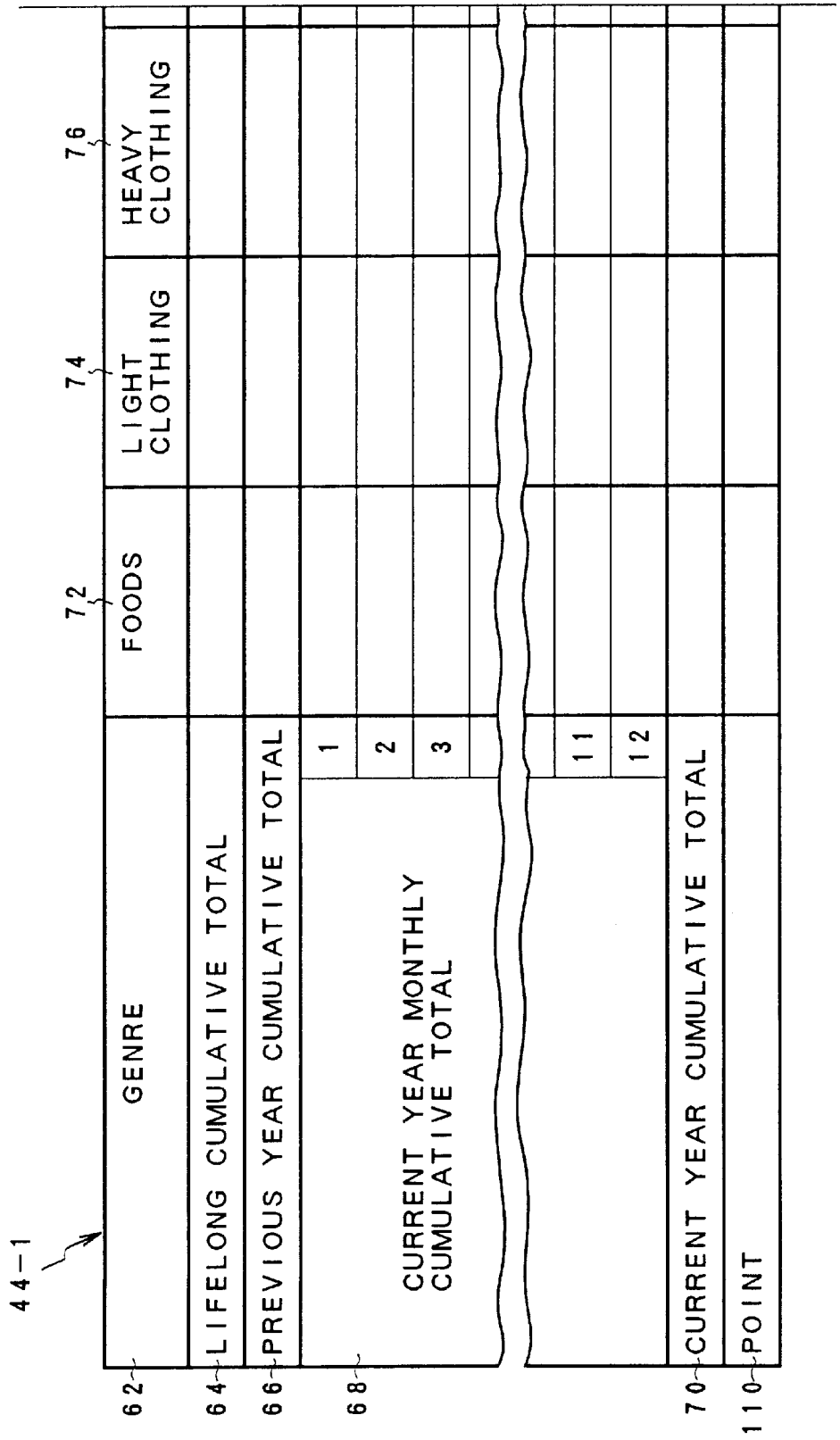
FIGS. 15A and 15B are explanatory diagrams of a purchase history table on the IC card, which is used for a point service.
Figure 15B:
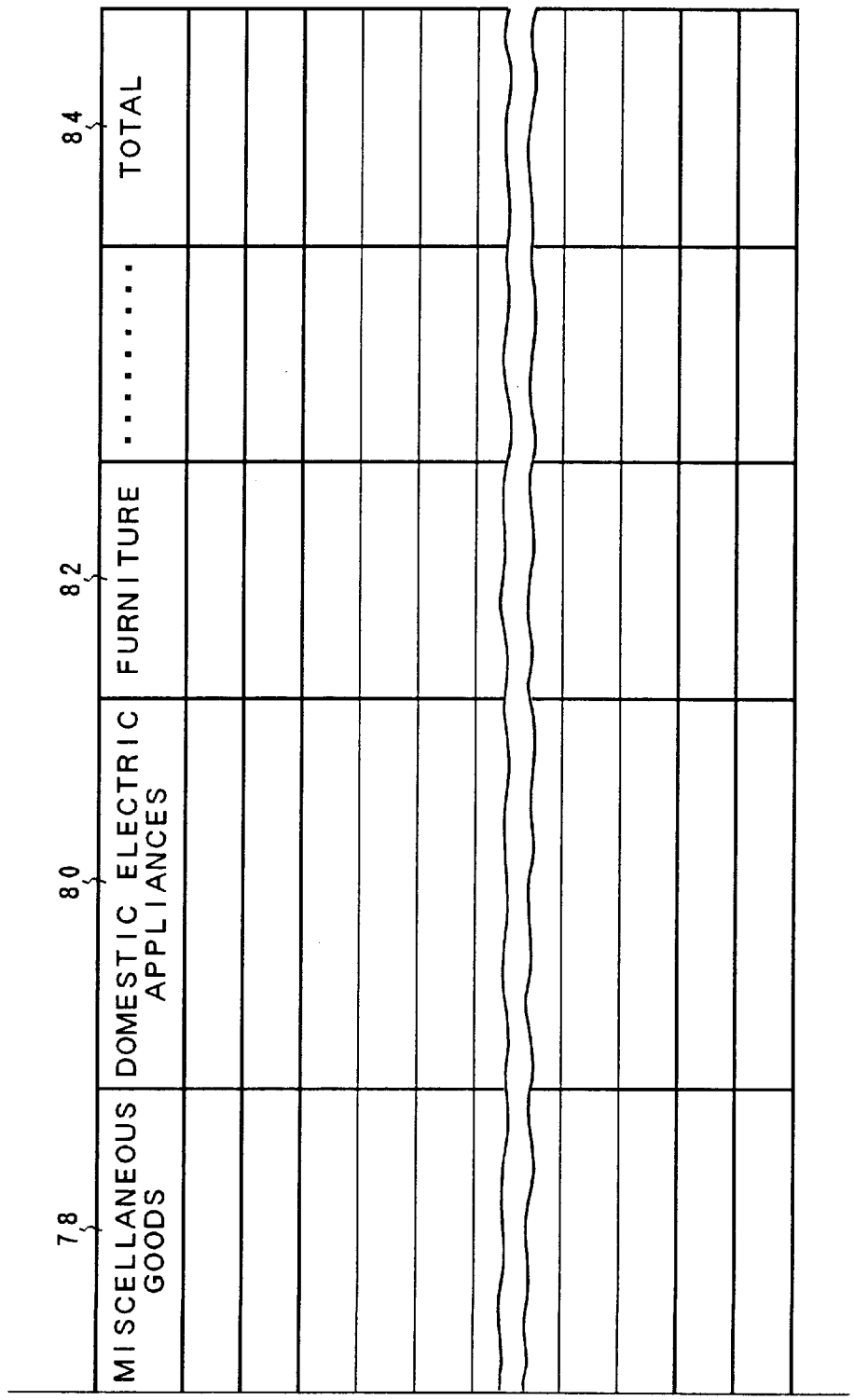

FIGS. 15A and 15B illustrate an embodiment of the purchase history table on the IC card 10 in case the point service is provided by the service processing unit 60 disposed in the POS terminal 20 in the embodiment of FIG. 3. A purchase history table 44-1 on the IC card for use in this point service employs the purchase amount as the purchase results for example and has basically the same configuration as that of the purchase history table 44-1 of FIG. 4 except that a record row of a point 110 is additionally provided for the point service.

Figure 16A:
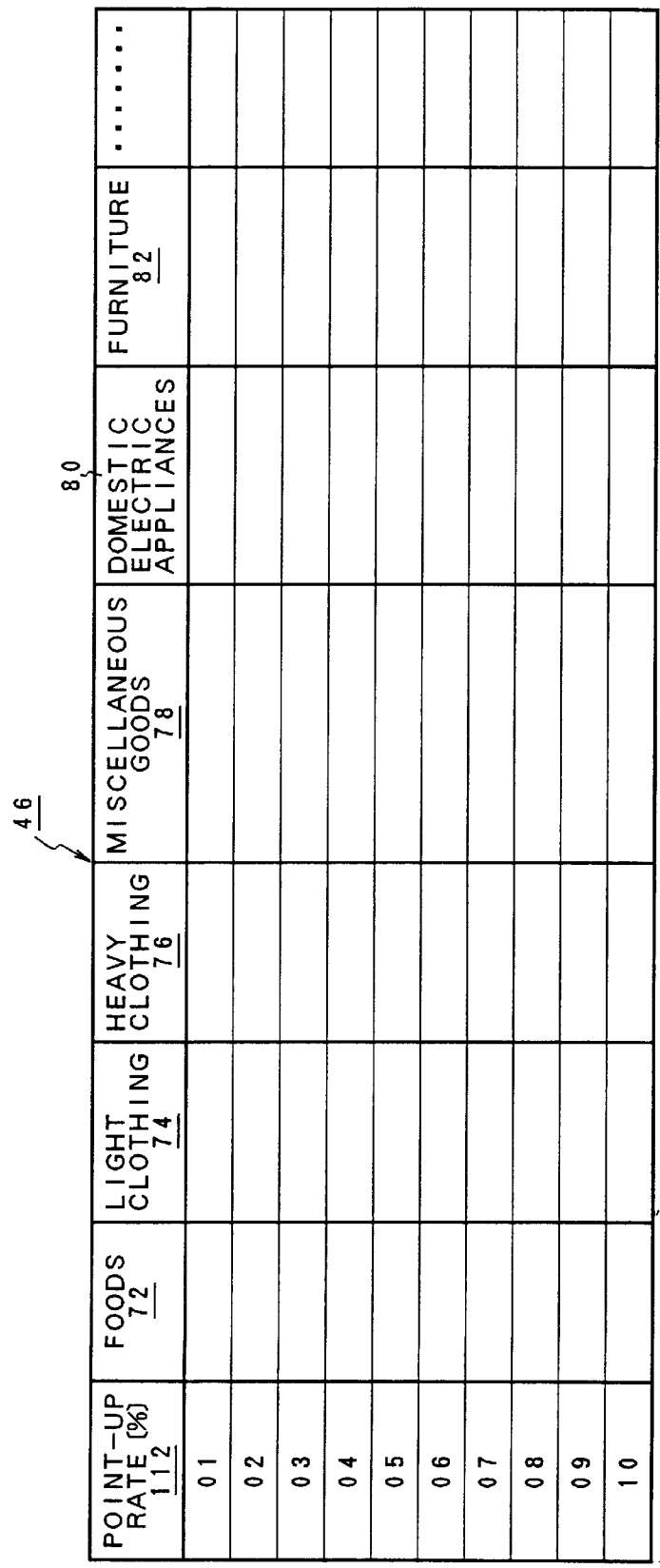
FIGS. 16A and 16B are explanatory diagrams of a premium table on the IC card, which is used for the point service.
Figure 16B:
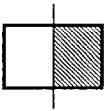

FIGS. 16A and 16B illustrate a premium table 46 on the IC card 10 of FIG. 3 for use in the point service. This premium table 46 for use in the point service has basically the same configuration as that of the discount rate premium table except that it has a point-up rate 112 in place of the discount rate 94 of the premium table 46 of FIG. 6. In case the point service is provided, the relation of correspondence of the point number to the purchase amount is previously determined in such a manner that one point is given for each purchase of ¥1,000 for example. For this reason, upon the provision of the point service, the purchase amount is converted into a point number, after which reference is made to the purchase history table 44-1 of FIGS. 15A and 15B to acquire the current year cumulative total 70 for example to determine the point-up rate from the premium table 46 of FIGS. 16A and 16B, for example, from the corresponding amount range of the premium table 46-11 of the foods 72 on the basis of the current cumulative amount. After the determination of the point-up rate in this manner, the point number obtained by converting the purchase amount is multiplied by the point-up rate to obtain a premium point, which in turn is added to the row of the point 110 of the genre in question of FIGS. 15A and 15B. In case a determination such as one point per ¥1000 is made for example, the multiplication of the point number obtained from the purchase amount by the point-up rate results in decimal values, which require a floating-point arithmetic and hence cumbersome processing. Therefore, the values to the second decimal place defining the point-up rate are all treated as integers. More specifically, a rule such as 100 points per ¥1,000 is determined, allowing a simple treatment of only the integer calculation.

Figure 17B:
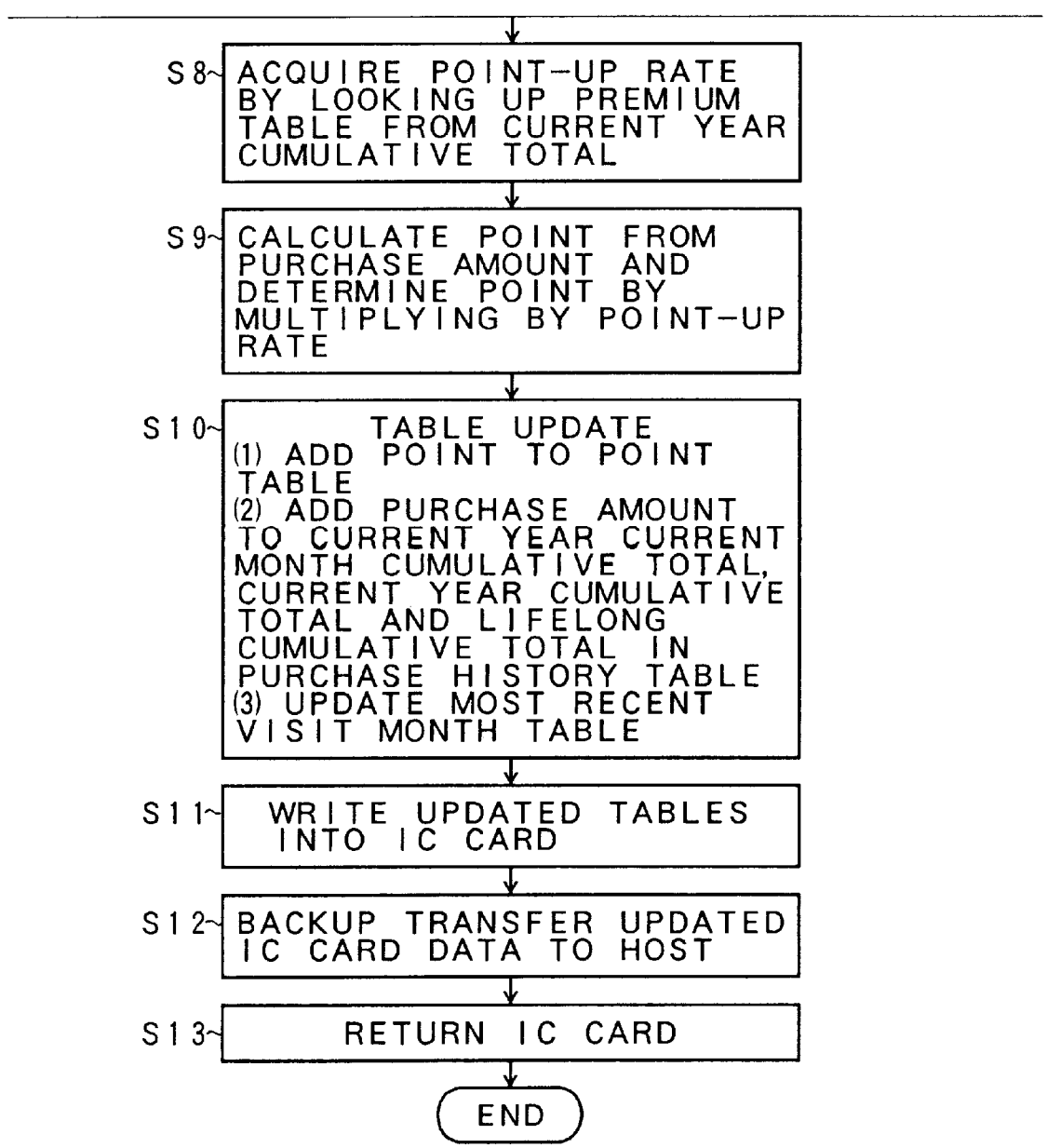

FIGS. 17A and 17B are flowcharts in case the service processing unit 60 of FIG. 3 provides the point service. From the steps S1 to S7, the point service processing is the same as the discount service processing of FIGS. 13A and 13B, but it is different therefrom in steps S8 to S10 including acquisition of the point-up rate from the premium table, calculation of the point based on the point-up rate, and addition of the point in the table updating. From steps S11 to S13 after the completion of the table updating in step S10, the processing is the same as that of the discount service.

Transfer of Premium

Figure 18:
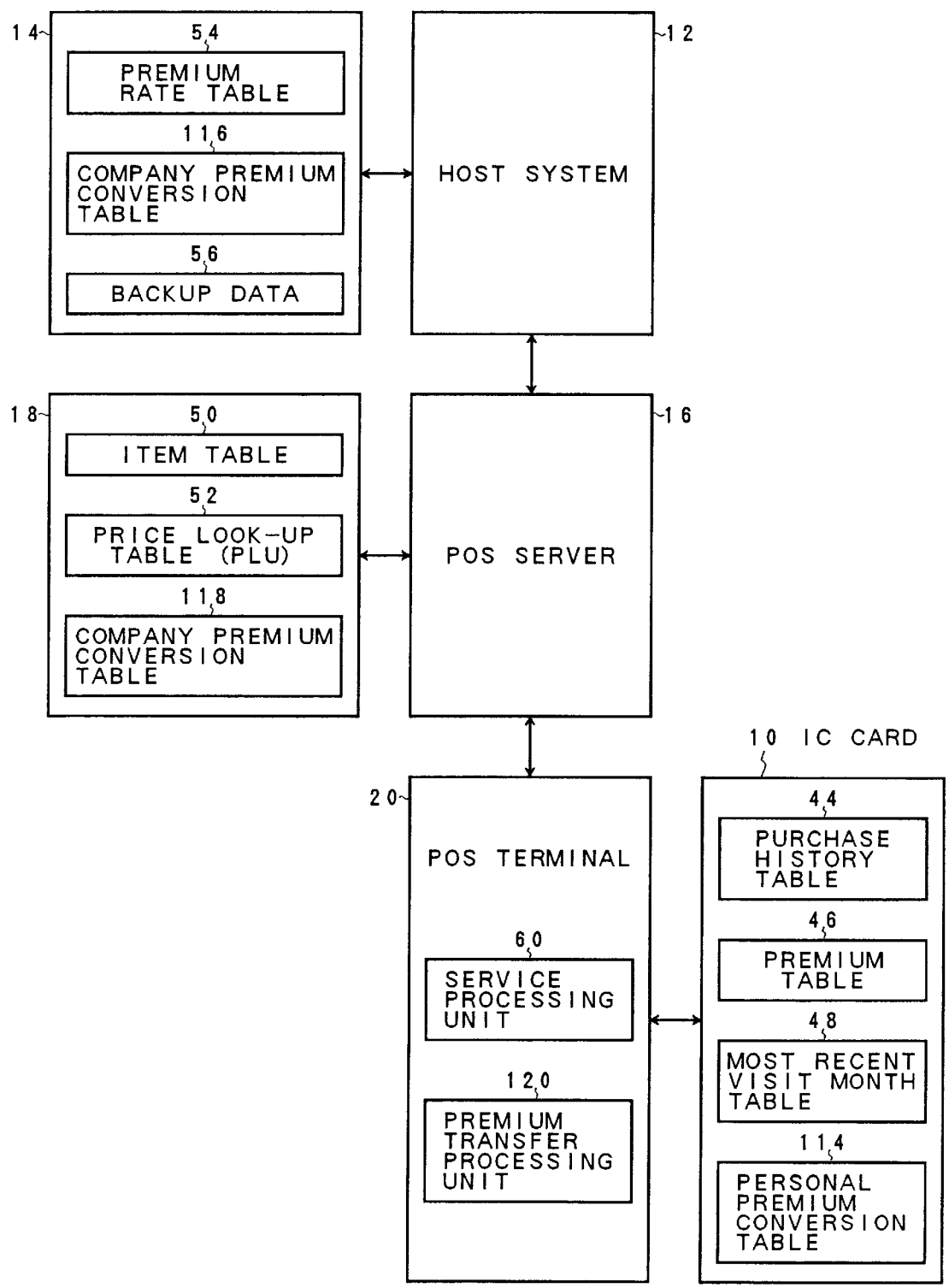
FIG. 18 is a function block diagram of another embodiment of the present invention allowing a transfer of premium.

FIG. 18 is a function block diagram of the POS system to which is applied another embodiment of the customer service apparatus of the present invention. This embodiment is characterized in that it makes it possible to transfer the premium of the customer acquired as a function of the degree of contribution which is representative of the purchase results. The function configuration of the POS system in this embodiment is basically the same as that of FIG. 3 except that the IC card 10 is provided with a personal premium conversion table 114 for the transfer of the premium. The POS terminal 20 further includes a premium transfer processing unit 120. The file apparatuses 14 and 18 associated with the host system 12 and the POS server 16, respectively, further include company premium conversion tables 116 and 118, respectively.

FIG. 19 illustrates the personal premium conversion table 114 recorded on the IC card 10 of FIG. 18. The personal premium conversion table 114 has relation 122, same genre 124 and different genre 126. The relation 122 includes conjugal, parent and child, relatives and others. The same genre 124 includes conversion rates applied as a result of transfer of the premium in the same genre between two customers specified by the relation 122. On the contrary, the different genre 126 includes conversion rates applied as a result of transfer of the premium between different genres. The same genre 124 has descending conversion rates in the order of conjugal, parent and child, relatives and others of the relations 122. The different genre 126 also has descending conversion rates in the order of conjugal, parent and child, relatives and others and has lower conversion rates than those of the same genre 124. The embodiment of FIG. 18 employs the point value of the point service as the premium transferred between two IC cards 10 including the conjugal, parent and child, relatives and others in accordance with this personal premium conversion table 114. Naturally, in case the service processing unit 60 provides the discount service, the transfer premium value can be the current year cumulative total 70 in the purchase history table 44-1 of FIG. 4 for example which is the grounds for determining the discount rates in the premium table 46. The transfer of the current year cumulative total 70 in this case is merely a transfer of the premium in the form of a return profit represented by the amount, but not a transfer of the monetary value as in the electronic money system.

FIG. 20 illustrates an embodiment of the company premium conversion tables 116 and 118 stored in the host system 12 and the POS server 16 of FIG. 18, showing an intra-company conversion table 118-1 by way of example. The intra-company conversion table 118-1 has a tournament arrangement including a row of transferor 128 and a column of transferee 130. Defined therein are conversion rates applied upon the transfer of the point from the genre of the commodity actually purchased to the transferee genre specified by the customer. These inter-genre conversion rates are defined in view of the profit rates of the commodities of each genre.

FIG. 21 illustrates another embodiment of the company premium conversion tables 116 and 118 stored in the host system 12 and the POS server 16 of FIG. 18, showing an inter-company conversion table 118-2. This inter-company conversion table 118-2 also has conversion rates in a tournament arrangement including the genres of the transferor 128 and the genres of the transferee 130. The inter-company conversion table 118-2 has lower conversion rates than those of the intra-company conversion table 118-1 of FIG. 20, to thereby reduce the degree of reflection to the other-company's premium service of the degree of contribution to the own company, to sufficiently suppress the service application costs of the own company arising from the degree of contribution associated with the premium server of the other company. The intra-company conversion table 118-1 of FIG. 20 can be used for the transfer between stores of the same company or between the companies belonging to the same company group. The inter-company conversion table 118-2 of FIG. 21 can be used for the transfer between two different companies or between two different company groups. More specifically, it includes the transfer between two different companies belonging to the same business type and the same business status, such as from a department store to another department store and from a specialty store to a department store; and the transfer between two different companies belonging to the different business type and different business status such as from a hotel to an airline and from a department store to a restaurant. Naturally, a plurality of premium conversion tables may be provided in accordance with the relation of correspondence between the transferee and the transferor and with the type thereof.

Figure 22A:
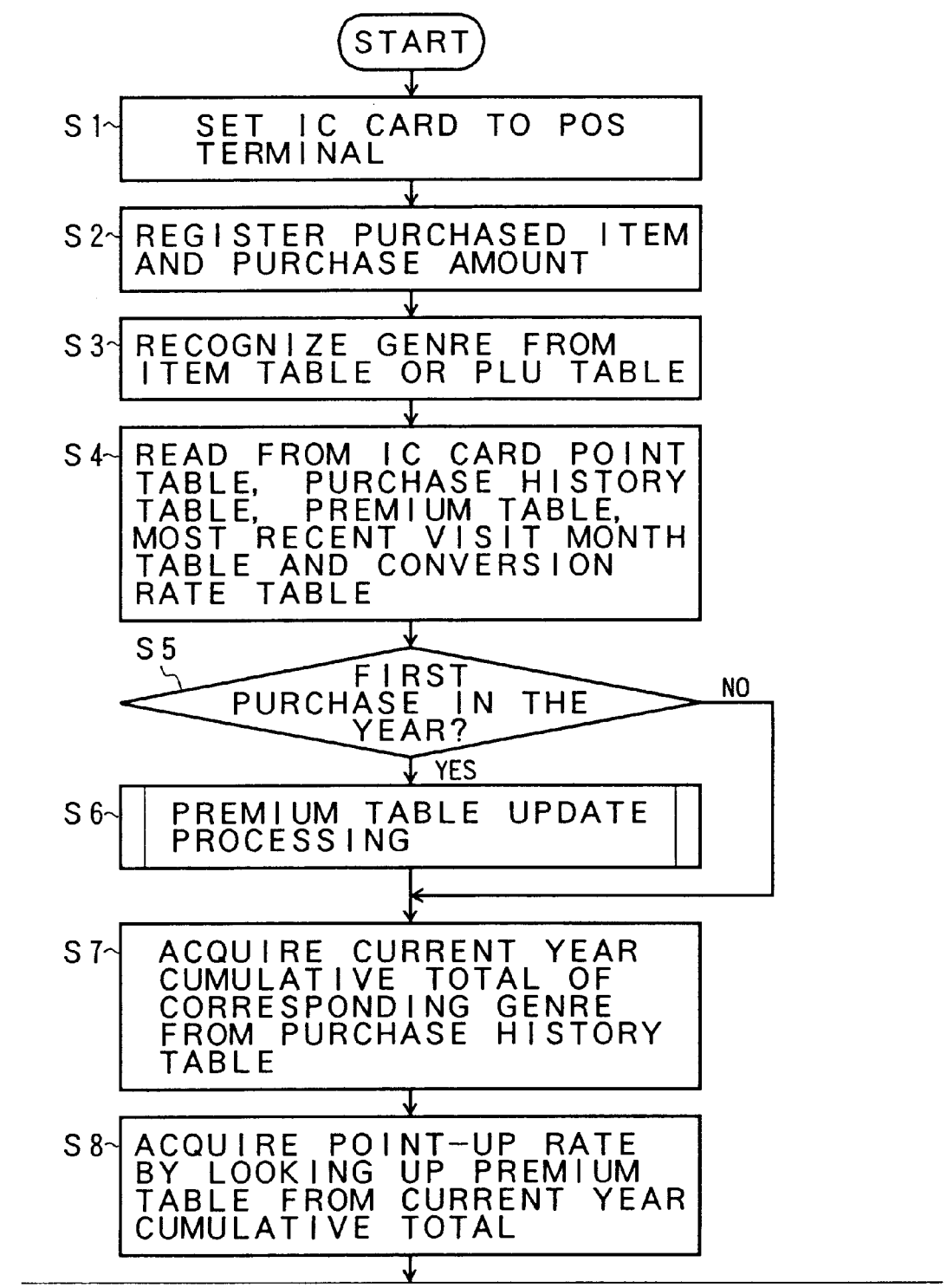

FIGS. 22A and 22B illustrate a flowchart of the point service for automatically transferring the point to a genre specified by the customer upon the purchase of a commodity in case of the point service effected by the service processing unit 60 of FIG. 18 by way of example. The processing in steps S1 to S9 is the same as that of the point service of FIG. 17. After the determination of a point from a premium point-up rate in step S9, a check is made in step S10 to see if a request for transfer of the point is present or not. If the request for transfer of the point is present, then premium transfer processing is carried out in accordance with the conversion rates of the intra-company conversion table 118-1 of FIG. 20 or the inter-company conversion table 118-2 of FIG. 21 for example. Then in step S12, the result is added to the point of the specified genre in question. The processing in steps S13 to S15 after the addition of the point is the same as that in steps S10 to S13 of FIG. 17.

Figure 23:
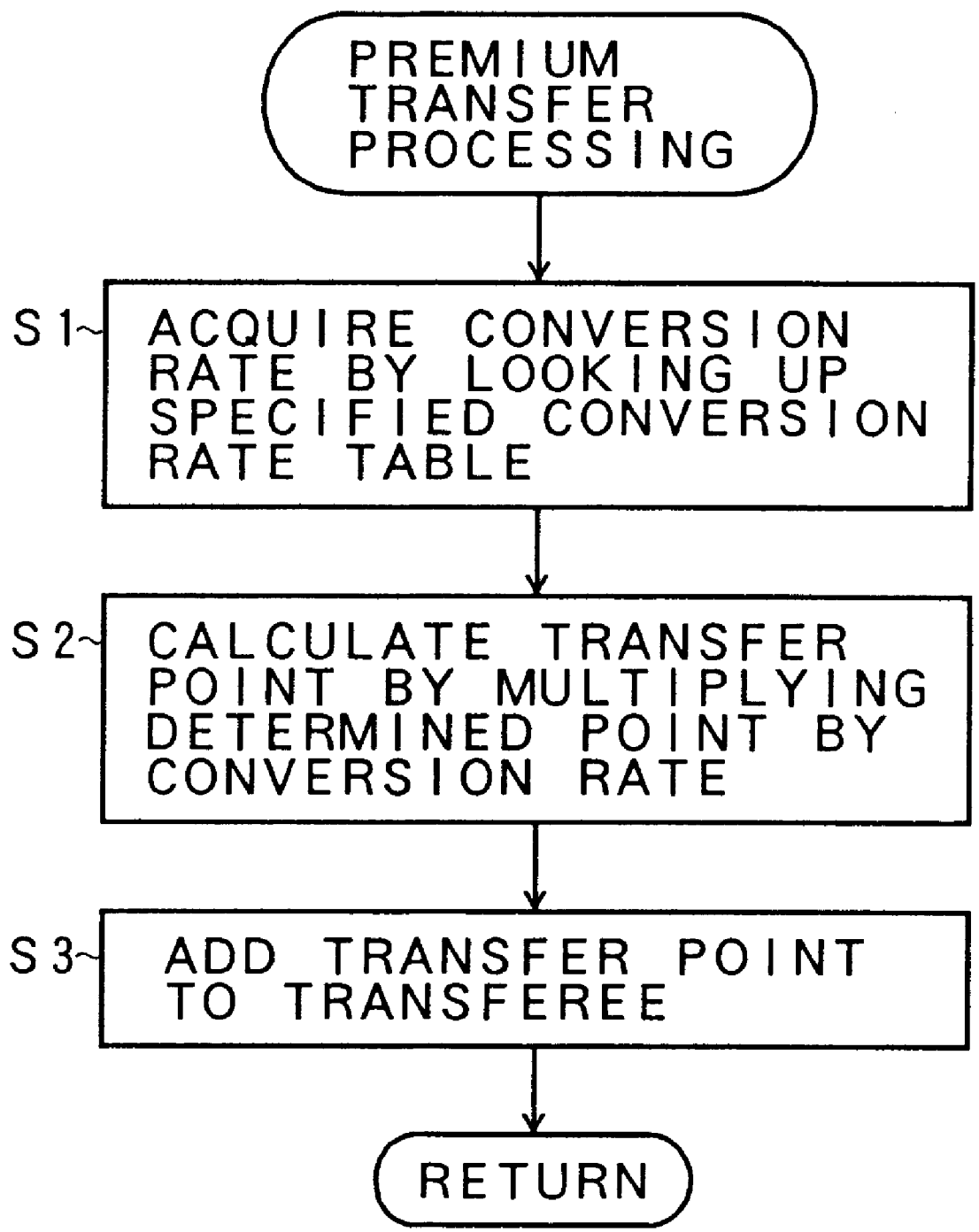
FIG. 23 is a detailed flowchart of premium transfer processing of FIG. 22.

FIG. 23 illustrates in the form of a subroutine the detail of the premium transfer processing of the step S11 of FIG. 22B. In step S1 of this premium transfer processing, reference is made to a specified conversion rate table to acquire a conversion rate from the relation between the transferor genre and the transferee genre. Then in step S2, the determined point is multiplied by the conversion rate acquired from the conversion table to figure out a transfer point. Finally in step S3, the transfer point is added to the transferee genre.

Figure 24:
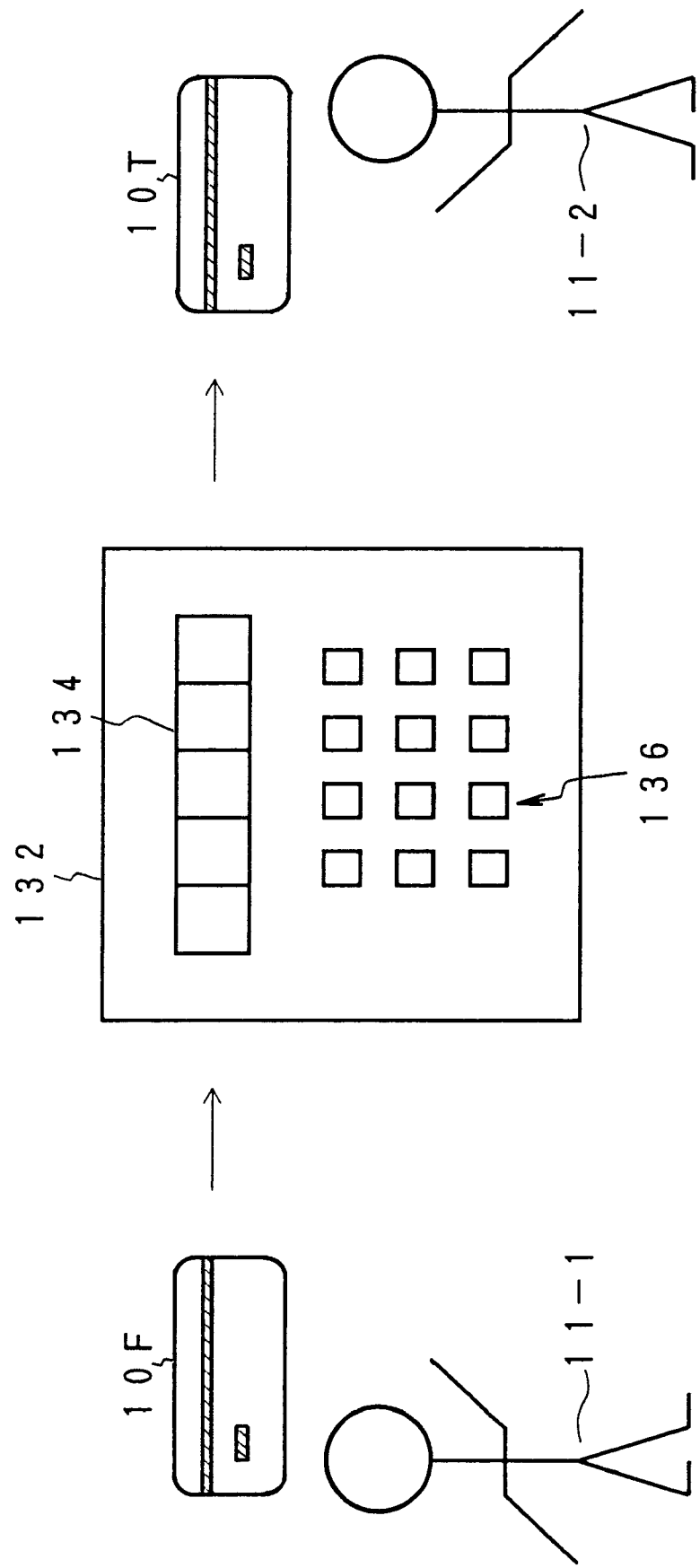
FIG. 24 is an explanatory diagram of a premium transfer between the IC cards using a wallet.

FIG. 24 is an explanatory diagram for transferring between two point cards 10 in the embodiment of FIG. 18 the point acquired by the point service in accordance with the personal premium conversion table 114 of FIG. 19. An apparatus for premium transfer can be for example a wallet 132 which provided in the electronic money system. The wallet 132 is provided with a display unit 134 and a ten key 136 and allows a setting of two IC cards. Upon the transfer, a transferor IC card 10F and a transferee IC card 10T are set to the wallet 132. The transferor IC card 10F is possessed by a customer 11-1 and has previously registered individual attribute information of the customer 11-1. The transferee IC card 10T is possessed by a customer 11-2 and has previously registered individual attribute information of the customer 11-2.

Figure 25:
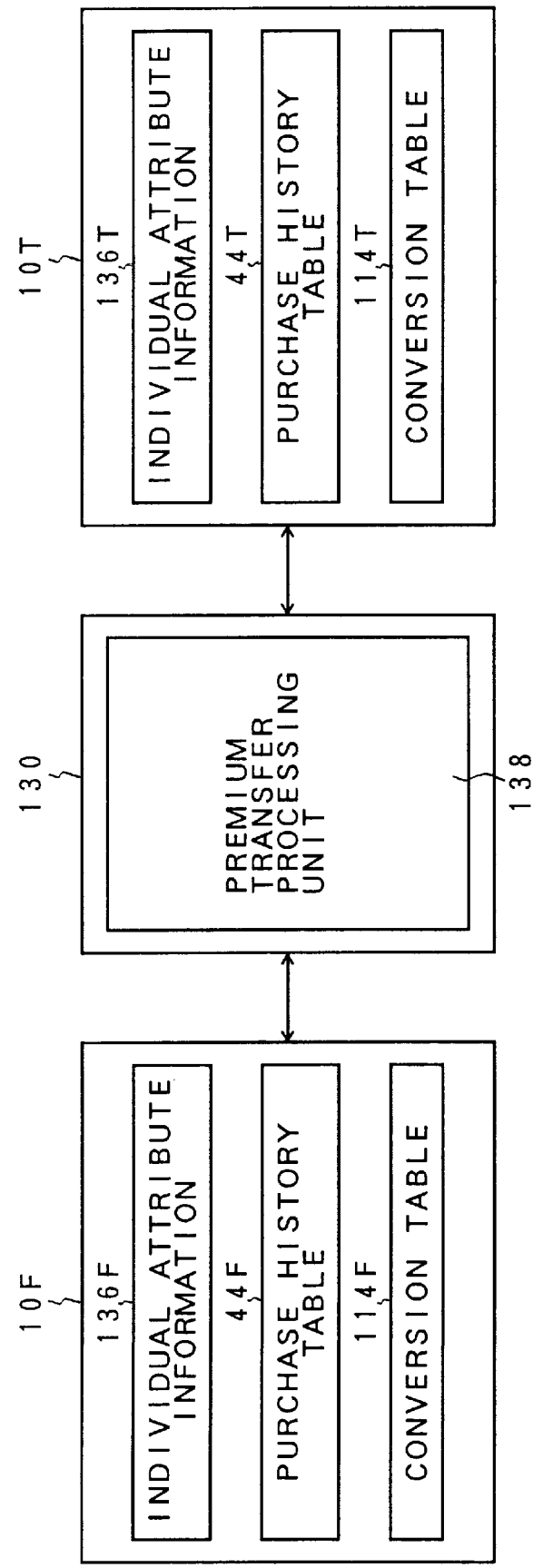
FIG. 25 is a block diagram of a premium transfer function of FIG. 24.

FIG. 25 is a function block diagram of the premium transfer processing effected by the wallet 132 of FIG. 24. The transferor IC card 10F and the transferee IC card 10T store therein respectively the individual attribute information 136F and 136T, purchase history tables 44F and 44T and conversion tables 114F and 114T. The individual attribute information 136F and 136T includes information required for the premium transfer such as parent and child, relatives and friends with respect to the individual attribute. The purchase history tables 44F and 44T have the content of FIG. 15. The personal premium conversion tables 114F and 114T have the set content of FIG. 19 for example. The wallet 132 allows simultaneous setting of and access to the transferor IC card 10F and the transferee IC card 10T and is provided with a premium transfer processing unit 138 for the premium transfer.

Figure 26:
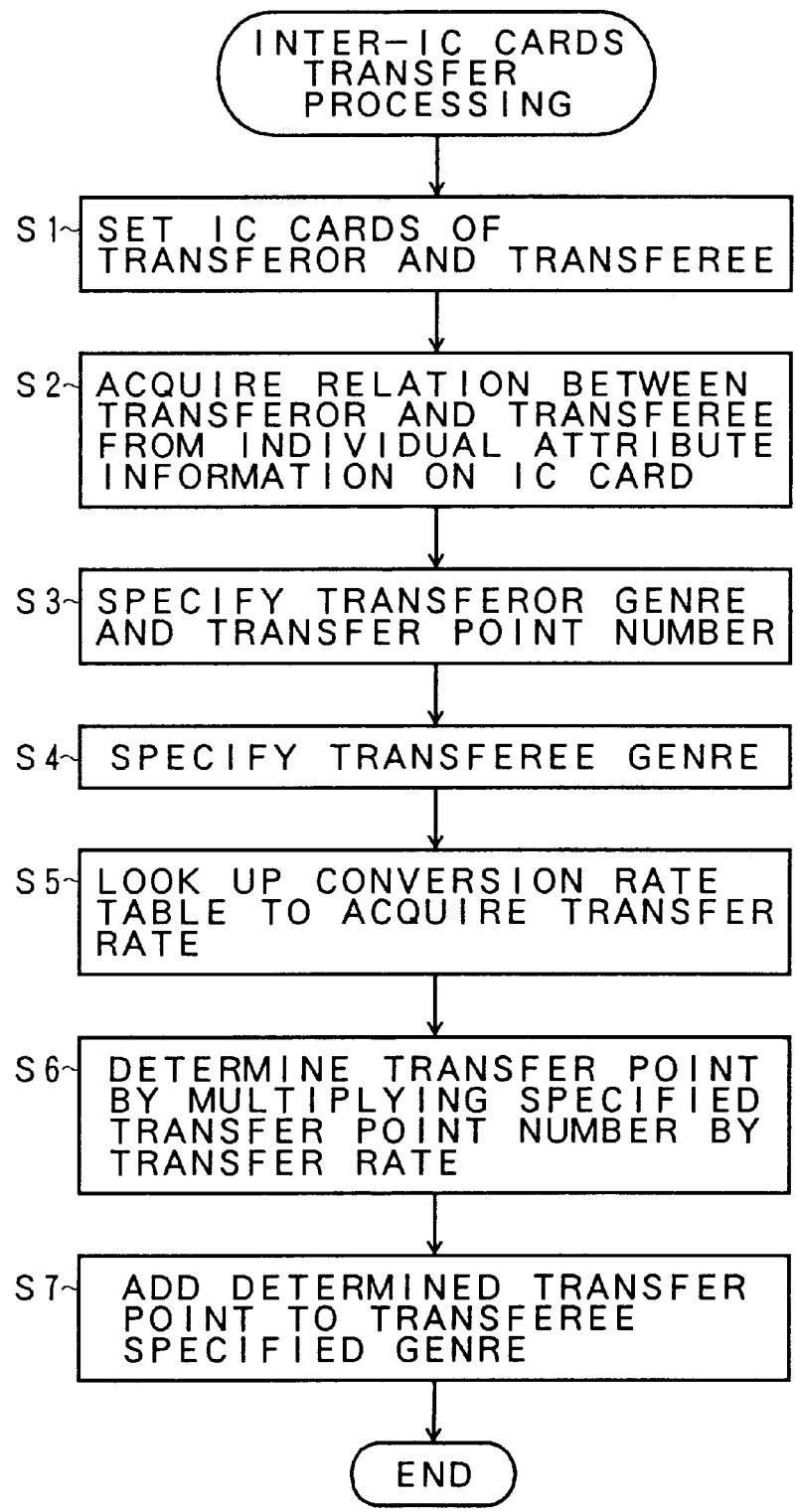
FIG. 26 is a flowchart of the premium transfer processing of FIG. 24.

FIG. 26 is a flowchart of the inter-IC card premium transfer processing effected by the premium transfer processing unit 138 provided in the wallet 132 of FIG. 25. First in step S1, setting is made of the transferor IC card and the transferee IC card. Then in step S2, the relation between the transferor and the transferee is acquired from the individual attribute information 136F and 136T of the IC cards. This allows the relation between the transferor and the transferee to be recognized as conjugal, parent and child, relatives or others. Then in step S3, specification is made of the transferor genre and the transfer point number. Then in step S4, the transferee genre is specified. After the completion of the above specification, reference is made to the personal premium conversion table in step S5 to acquire a transfer rate. If conjugal is recognized as the relation 122 with the same genre 124 recognized as the genre with respect to FIG. 19 for example, 95% of conversion rate is acquired. Then in step S6, the specified transfer point number is multiplied by the transfer rate obtained from the conversion rate table to determine the point number to be transferred. Finally in step S7, the thus determined transfer point number is added to the point of the specified genre which is the transferee. Although the embodiment of FIG. 24 makes use of the wallet 132 for the transfer of the point service, a personal computer provided with a reader/writer of the IC card 10 could also be used or the POS terminal 20 of FIG. 18 would also be available for the transfer.

Furthermore, the present invention provides a computer readable record medium having thereon recorded a customer service processing program having a service processing function of FIGS. 13, 17 and 22. The record medium having thereon recorded the customer service processing program includes a removable storage medium such as a CD-ROM and a floppy disk, a storage device of the program provider who provides a program through lines, and a memory device such as a RAM and a hard disk memory of a program installed processor. The customer service processing program provided by the record medium is loaded into the processor such as the POS terminal for example and is run on its main memory.

As set forth hereinabove, the present invention is capable of concentratedly providing services for returning the profit in accordance with the degree of contribution to regular customers having higher degree of contribution due to a larger purchase amount or frequent visit. The present invention is capable of obviating an excess expenditure arising from a provision of vain service to unfamiliar customers who may have relatively low degree of contribution and may intend to purchase a commodity at a net price, thereby preventing a reduction of profit attributable to the unnecessary expenditure. The present invention is further capable of providing an appropriate service corresponding to the commodity characteristics yielding different profits in such a manner that even in the case of regular customers having a higher degree of contribution, more service is provided for the genre having a high degree of contribution but less or unchanged service is provided for the genre having a low degree of contribution. It is also possible to provide an effective direct mailing service through sending of direct mails to appropriate targets by analyzing the purchase results information indicative of the degree of contribution of the customers recorded on the IC cards, thereby allowing an improvement in the hit ratio, resulting in a reduction of vain direct mails and in a reduction of costs. It is also possible to introduce appropriate events to the customers by analyzing the degree of contribution such as the purchase results on the IC cards. The present invention further allows a transfer of the premium imparted to the customers as a return of profit, thereby enabling the customers to enhance the conveniences and effectiveness of the acquired premium. Furthermore, provision of appropriate conversion rates upon the transfer prevents a transfer of excessive service by the service providing company. In addition, introduction into the conversion rates of area characteristics such as a main store and branches ensures an appropriate transfer of the premium corresponding to the profit of the store.

It is to be appreciated that the present invention is not limited to the above embodiments and that it may be variously modified without impairing its objects and advantages. Furthermore, the present invention is not intended to be restricted by numerical values shown in the above embodiments.

What is claimed is:

1. A customer service apparatus comprising:

a carriable card with a built-in integrated circuit including a processor and a memory, said memory storing therein purchase history information having purchase results recorded on a genre-to-genre basis and premium information having premium values defined in accordance with said purchase results on a genre-to-genre basis, and further conversion information defining conversion rates upon a transfer of premium values to another IC card;

a service processing unit which refers to said purchase history information of said card on the basis of a genre of a purchased commodity to acquire purchase results and which refers to said premium information of said card on the basis of said acquired purchase results to acquire corresponding premium values, thereby providing discount services or points in conformity with said acquired premium values; and a premium transfer processing unit which multiplies the premium value of a transferor IC card by a conversion rate of said conversion information for executing a transfer of premium values to a transferee IC card.

2. A customer service apparatus according to claim 1, wherein said genre is defined by commodities or areas.

3. A customer service apparatus according to claim 1, wherein said purchase history information of said card includes the lifelong cumulative total, the previous year cumulative total, the current year monthly cumulative total and the current year cumulative total of the purchase amount recorded on a genre-to-genre basis.

4. A customer service apparatus according to claim 1, wherein said purchase history information of said card includes the lifelong cumulative number of times, the previous year cumulative number of times, the current year monthly cumulative number of times and the current year cumulative number of times of the visit number of times recorded on a genre-to-genre basis.

5. A customer service apparatus according to claim 1, wherein said premium information of said card has discount rates defined in accordance with said purchase results, and wherein said service processing unit multiplies the purchase amount with a discount rate acquired from said premium information upon the purchase to determine the amount billed, said service processing unit further updating purchase result information of said card.

6. A customer service apparatus according to claim 1, wherein said purchase history information of said card has points recorded in accordance with said purchase results on a genre-to-genre basis, said premium information having point-up rates defined in accordance with said purchase results, and wherein said service processing unit multiplies a point obtained from the purchase amount by a point-up rate acquired from said premium information to determine a point, said service processing unit further adding said determined point to the existing point of purchase result information of said card.

7. A customer service apparatus according to claim 5, wherein said service processing unit includes an item table having thereon defined commodity item codes, items and genres and includes a price look-up table having thereon defined price look-up codes, prices and genres, said service processing unit acquiring a genre of a purchased commodity from said item table or said price look-up table.

8. A customer service apparatus according to claim 1, wherein said memory of said card further stores most recent visit month information therein, and wherein said service processing unit recognizes a most recent visit month from said card and refers to said premium information based on the previous month cumulative total of said purchase history information to determine a premium value.

9. A customer service apparatus according to claim 1, wherein said service processing unit updates said premium information on the basis of said purchase history information of said card.

10. A customer service apparatus according to claim 9, wherein upon a first purchase within a predetermined period, said service processing unit updates said premium information on the basis of said purchase result information of said card.

11. A customer service apparatus according to claim 10, wherein upon a first purchase in a year, said service processing unit updates said premium information on the basis of said purchase result information of said card.

12. A customer service apparatus according to claim 10, wherein said service processing unit updates said premium information on the basis of lifelong results recorded in said purchase result information of said card.

13. A customer service apparatus according to claim 1, wherein said conversion information of said card includes conversion rates defined in accordance with the relations between the possessors of a transferor IC card and a transferee IC card.

14. A customer service apparatus according to claim 13, wherein said conversion information of said card includes conversion rates defined in accordance with the relations such as conjugal, parent and child, relatives and others.

15. A customer service apparatus according to claim 13, wherein said conversion information of said card includes conversion rates defined in a manner separating a transfer within the same genre from a transfer between different genres.

16. A customer service apparatus according to claim 1, wherein said service processing unit comprises a premium transfer processing unit which includes conversion information defining conversion rates for converting premium values of each genre into premium values of the other genres and which multiplies a premium value determined upon the purchase of a commodity by said conversion rate for the conversion into a premium value of the other genre to thereby update said premium information.

17. A customer service apparatus according to claim 16, wherein said premium transfer processing unit defines said conversion information in the form of conversion information for a premium transfer within the same company or within the same company group.

18. A customer service apparatus according to claim 16, wherein said premium transfer processing unit defines said conversion information in the form of conversion information for a premium transfer between the different companies or between the different company groups.

19. A customer service method using a carriable card with a built-in integrated circuit including a processor and a memory, said method comprising the steps of:

referring to purchase history information of said card with a built-in integrated circuit including a processor and a memory on the basis of a genre of a purchased commodity, to acquire a purchase result;

referring to premium information of said card on the basis of said acquired purchase result, to acquire a corresponding premium value;

providing a service as a function of said acquired premium value; and when the premium values of said card are transferred to another card, multiplying a premium value of a transferor IC card by a conversion rate of conversion information acquired from said card to thereby execute a transfer of said premium value to a transferee IC card.

20. A customer service method according to claim 19, further comprising the steps of:

preparing conversion information defining conversion rates for the conversion of premium values of each genre into premium values of another genre; and multiplying a premium value determined upon the purchase of a commodity by said conversion rate for the conversion into a premium value of another genre to thereby update premium information of said card.

21. A carriable card with a built-in integrated circuit including a processor and a memory, wherein said memory stores therein purchase history information having purchase results recorded on a genre-to-genre basis and premium information having premium values defined in accordance with purchase results on a genre-to-genre basis.

22. A carriable card according to claim 21, wherein said purchase history information includes the lifelong cumulative total, the previous year cumulative total, the current year monthly cumulative total and the current year cumulative total of the purchase amount or the visit number of times recorded on a genre-to-genre basis.

23. A carriable card according to claim 21, wherein said memory stores therein conversion information defining conversion rates for the transfer of premium values of said premium information into another IC card.

24. A computer readable record medium having a customer service processing program recorded therein, wherein said customer service processing program comprises:

referring to purchase history information of a card with a built-in integrated circuit including a processor and a memory on the basis of a genre of a purchased commodity to acquire a purchase result;

referring to premium information of said card on the basis of said acquired purchase result to acquire a corresponding premium value;

providing a service as a function of said acquired premium value, and upon the transfer of a premium value of a card to another card, multiplying a premium value of a transferor card by a conversion rate of conversion information acquired from said card to execute a transfer of said premium value to a transferee card.

25. A computer readable record medium according to claim 24, wherein said customer service processing program prepares conversion information defining conversion rates for the conversion of premium values of each genre into premium values of another genre, said customer service processing program multiplying a premium value determined upon the purchase of a commodity by said conversion rate for the conversion into a premium value of another genre to thereby update said premium information.

26. A customer service apparatus comprising:

a carriable card with a built-in integrated circuit including a processor and a memory, said memory storing therein purchase history information having purchase results recorded on a genre-to-genre basis, premium information having premium values defined in accordance with said purchase results on a genre-to-genre basis, and further conversion information defining conversion rates upon a transfer of said premium values to another IC card;

a service processing unit which refers to said purchase history information of said card on the basis of a genre of a purchased commodity to acquire purchase results and which refers to said premium information of said card on the basis of said acquired purchase results to acquire corresponding premium values, thereby providing discount services or points in conformity with said acquired premium values; and a premium transfer processing unit for transferring a premium value of an IC card to another IC card.

27. A customer service method using a carriable card with a built-in integrated circuit including a processor and a memory, said method comprising:

referring to purchase history information of said card with a built-in integrated circuit including a processor and a memory on the basis of a genre of a purchased commodity, to acquire a purchase result;

referring to premium information of said card on the basis of said acquired purchase result, to acquire a corresponding premium value;

providing a service as a function of said acquired premium value; and transferring a premium value of a card into another card.

28. A computer readable record medium having a customer service processing program recorded therein, wherein said customer service processing program comprises:

referring to purchase history information of a card on the basis of a genre of a purchased commodity to acquire a purchase result;

referring to premium information of said card on the basis of said acquired purchase result to acquire a corresponding premium value;

providing a service as a function of said acquired premium value; and transferring a premium value of a card to another card.

29. A customer service method using a carriable card with a built-in integrated circuit including a memory, comprising:

storing in the memory purchase history information having purchase results recorded on a genre-to-genre basis and premium information having premium values defined in accordance with purchase results on a genre-to-genre basis.

* * * * *